US012473599B2

(12) United States Patent
Meves et al.

(10) Patent No.: US 12,473,599 B2
(45) Date of Patent: Nov. 18, 2025

(54) GENE SIGNATURES FOR PREDICTING METASTASIS OF MELANOMA AND PATIENT PROGNOSIS

(71) Applicants: SkylineDx B.V., Rotterdam (NL); Mayo Foundation for Medical Education and Research, Rochester, MN (US)

(72) Inventors: Alexander Meves, Rochester, MN (US); Domenico Bellomo, The Hague (NL)

(73) Assignees: SkylineDx B.V., Rotterdam (NL); Mayo Foundation for Medical Education and Research, Rochester, MN (US)

( * ) Notice: Subject to any disclaimer, the term of this patent is extended or adjusted under 35 U.S.C. 154(b) by 873 days.

(21) Appl. No.: 17/262,175

(22) PCT Filed: Jul. 25, 2019

(86) PCT No.: PCT/NL2019/050487
§ 371 (c)(1),
(2) Date: Jan. 21, 2021

(87) PCT Pub. No.: WO2020/022895
PCT Pub. Date: Jan. 30, 2020

(65) Prior Publication Data
US 2021/0301353 A1 Sep. 30, 2021

Related U.S. Application Data

(60) Provisional application No. 62/778,777, filed on Dec. 12, 2018, provisional application No. 62/750,294, filed on Oct. 25, 2018, provisional application No. 62/703,221, filed on Jul. 25, 2018.

(51) Int. Cl.
C12Q 1/68 (2018.01)
C12Q 1/6806 (2018.01)
C12Q 1/686 (2018.01)
C12Q 1/6886 (2018.01)

(52) U.S. Cl.
CPC ......... *C12Q 1/6886* (2013.01); *C12Q 1/6806* (2013.01); *C12Q 1/686* (2013.01); *C12Q 2600/118* (2013.01); *C12Q 2600/166* (2013.01)

(58) Field of Classification Search
None
See application file for complete search history.

(56) References Cited

U.S. PATENT DOCUMENTS

| 7,695,913 | B2 | 4/2010 | Cowens et al. |
| 2004/0010045 | A1 | 1/2004 | Yi |
| 2004/0110221 | A1 | 6/2004 | Twine et al. |
| 2006/0235001 | A1 | 10/2006 | Elliott et al. |
| 2007/0154889 | A1 | 7/2007 | Wang |
| 2008/0274908 | A1 | 11/2008 | Chang |
| 2009/0125247 | A1 | 5/2009 | Baker et al. |
| 2010/0028876 | A1 | 2/2010 | Gordon et al. |
| 2011/0123997 | A1 | 5/2011 | Kashani-Sabet et al. |
| 2011/0159496 | A1 | 6/2011 | Kashani-Sabet et al. |
| 2012/0071343 | A1 | 3/2012 | Ma et al. |
| 2012/0128667 | A1 | 5/2012 | Chow et al. |
| 2014/0045915 | A1 | 2/2014 | Skog et al. |
| 2015/0290289 | A1 | 10/2015 | Sampath |
| 2016/0115555 | A1 | 4/2016 | Ma et al. |
| 2016/0222457 | A1 | 8/2016 | Meves et al. |
| 2017/0275700 | A1 | 9/2017 | Meves et al. |
| 2020/0197518 | A1 | 6/2020 | Sadineni et al. |

FOREIGN PATENT DOCUMENTS

| JP | 2018-513159 A | 5/2018 |
| WO | 2014/077915 A1 | 5/2014 |
| WO | 2016025717 A | 2/2016 |
| WO | 2017/196944 A1 | 11/2017 |

OTHER PUBLICATIONS

Chung et al; Clin Exp Med; 2004, vol. 4, pp. 65-77.*
Robert et al; The New England Journal of Medicine, vol. 372, pp. 2521-2532; 2015.*
(American Joint Committee On Cancer) AJCC Cancer Staging Manual. Technical Manual [online]. 2002 [Retrieved on Jul. 28, 2017]. Retrieved from the Internet: <URL: https://cancerstaging.org/references-tools/deskreferences/Documents/AJCC6thEdCancerStagingManualPart2.pdf>; p. 209, Summary of Changes.
(Annex 1) American Cancer Society"Treatment of Melanoma Skin Cancer, by Stage" 4 pages, accessed Nov. 19, 2020, https://www.cancer.org/cancer/melanoma-skin-cancer/treating/by-stage.html.
Anders and Huber, "Differential expression analysis for sequence count data," Genome Biol., 11(10):R106, Epub Oct. 27, 2010.
Balch et al., "Final version of 2009 AJCC melanoma staging and classification," J Clin Oncol., 27(36):6199-6206, Epub Nov. 16, 2009.
Balch et al., "Sentinel node biopsy and standard of care for melanoma," J Am Acad Dermatol., 60(5):872-875, May 2009.
Benjamin et al., "p53 and the Pathogenesis of Skin Cancer", Toxicol Appl Pharmacol., Nov. 1, 2007; vol. 224 No. 3, pp. 241-248 (available in PMC Nov. 1, 2008, pp. 1-13), especially abstract, p. 2, 3rd para, p. 3, 2nd para, p. 4, last para, p. 7, last para-p. 8, 1st para.
Bernard et al., "Use of a new bioassay to study pentamidine pharmacokinetics," J Infect Dis., 152(4):750-754, Oct. 1985.
Breslow, "Thickness, cross-sectional areas and depth of invasion in the prognosis of cutaneous melanoma," Ann Surg., 172(5):902-908, Nov. 1970.

(Continued)

Primary Examiner — Jehanne S Sitton
(74) Attorney, Agent, or Firm — TraskBritt

(57) ABSTRACT

The disclosure provides gene signatures of classifying an individual afflicted with cutaneous melanoma. The "SLN gene signatures" provided herein classify an individual based on prognosis and/or classify an individual as having a metastasis-positive or -negative sentinel lymph node (SLN). The "N-SLN gene signatures" provided herein classify an individual as having a metastasis-positive or -negative non-sentinel lymph node (N-SLN).

14 Claims, 5 Drawing Sheets

(56) References Cited

OTHER PUBLICATIONS

Bullard et al., "Evaluation of statistical methods for normalization and differential expression in mRNA-Seq experiments," BMC Bioinformatics 11:94, Feb. 18, 2010.
Carlson et al., "Establishment, maintenance and in vitro and in vivo applications of primary human glioblastoma multiforme (GBM) xenograft models for translational biology studies and drug discovery," Curr Protoc Pharmacol., Chapter 14:Unit 14.16, Mar. 2011.
Chan et al., "Regulation of adhesion dynamics by calpain-mediated proteolysis of focal adhesion kinase (FAK)," J Biol Chem., 285(15):11418-11426, Epub Feb. 11, 2010.
ClinicalTrials.gov Identifier: NCT00729807, "Pentamidine in Treating Patients With Relapsed or Refractory Melanoma," ClinicalTrials.gov [online] 2008 [retrieved on Mar. 26, 2015]. Retrieved from the Internet: <URL: https://www.clinicaltrials.gov/ct2/show/NCT00729807?term=NCT00729807&rank= 1>, 4 pages.
Conway et al., "Gene expression profiling of paraffin-embedded primary melanoma using the DASL assay identifies increased osteopontin expression as predictive of reduced relapse-free survival," Clin Cancer Res., 15(22):6939-6946, Epub Nov. 3, 2009.
Coppe et al., "Senescence-associated secretory phenotypes reveal cell-nonautonomous functions of oncogenic RAS and the p53 tumor sunnressor," PLoS Biol., 6(12):2853-2868, Dec. 2, 2008.
European Communication pursuant to Article 94(3) EPC for European Application No. 19787488, dated May 31, 2022, 6 pages.
Hartman et al., "The Evolution of S100B Inhibitors for the Treatment of Malignant Melanoma", Future medicinal chemistry, Jan. 2013, vol. 5, No. 1, pp. 97-109. (available in PMC. Web pp 1-25), especially abstract, p. 5, 2nd para, p. 7, last para-p. 8, 1st par.
Infante JR et al., "Safety, pharmacokinetic, and pharmacodynamic phase I dose-escalation trial of PF-00562271, an inhibitor of focal adhesion kinase, in advanced solid tumors," J Clin Oncol., 30(13):1527-1533, Epub Mar. 26, 2012.
Kashani-Sabet et al., "A multi-marker assay to distinguish malignant melanomas from benign nevi," Proc Natl Acad Sci U S A., 106(15):6268-6272, Epub Mar. 30, 2009.
King et al. Gene Expression Profile Analysis by DNA Microarrays. JAMA 2001, vol. 286, No. 18, pp. 2280-2288 (Year: 2001).
Lee et al., "The novel combination of chlorpromazine and pentamidine exerts synergistic antiproliferative effects through dual mitotic action," Cancer Res., 67(23):11359-11367, Dec. 1, 2007.
Meves et al. "Tumor Cell Adhesion As a Risk Factor for Sentinel Lymph Node Metastasis in Primary Cutaneous Melanoma. Journal of Clinical Oncology" Aug. 10, 2015, vol. 33, No. 23; pp. 2509-2515; abstract; p. 2510,1st col. 3rd paragraph; p. 2511, 2nd col. 4th paragraph; p. 2513, 2nd col. 2nd paragraph; Table 3.
Meves et al., "Beta1 integrin cytoplasmic tyrosines promote skin tumorigenesis independent of their phosphorylation," Proc Natl Acad Sci U S A., 108(37):15213-15218, Epub Aug. 29, 2011.
Mitra et al., "Melanoma sentinel node biopsy and prediction models for relapse and overall survival," Br J Cancer., 103(8):1229-1236, Epub Sep. 21, 2010.
NEB catalog (1998/1999), pp. 121, 284. (Year: 1998).
Pathak et al., "Pentamidine is an inhibitor of PRL phosphatases with anticancer activity," Mol Cancer Ther., 1(14):1255-1264, Dec. 2002.
Ruczinski et al., "Logic regression," Journal of Computational and Graphical Statistics, 12(3):475-511, 2003.
Sanovic et al., "Time-resolved gene expression profiling of human squamous cell carcinoma cells during the apoptosis process induced by photodynamic treatment with hypericin," Int. J. Oncol., 35(4):921-39, Oct. 2009.
Seo et al., "The effect of substrate microtopography on focal adhesion maturation and actin organization via the RhoA/ROCK pathway," Biomaterials., 32(36):9568-9575, Epub Sep. 16, 2011.
Siiskonen et al., "Chronic UVR causes increased immunostaining of CD44 and accumulation of hyaluronan in mouse epidermis," J Histochem Cytochem., 59(10):908-917, Epub Aug. 10, 2011.
Simon et al., "Expression of CD44 isoforms in human skin cancer," Eur J Cancer., 32A(8):1394-1400, Jul. 1996.
Smith et al., "The effect of pentamidine on melanoma ex vivo," Anticancer Drugs, 21(2):181-185, Feb. 2010.
Sun and Zhang, "Pentamidine binds to IRNA through non-specific hydrophobic interactions and inhibits aminoacylation and translation," Nucleic Acids Res., 36(5):1654-1664, Mar. 2008.
Sun et al., "Overabundance of putative cancer stem cells in human skin keratinocyte cells malignantly transformed by arsenic," Toxicol Sci., 125(1):20-29, Epub Oct. 19, 2011.
Sun Yang et al. Overabundance of Putative Cancer Stem Cells in Human Skin Keratinocyte Cells Malignantly Transformed by Arsenic. Toxicol Sci, Jan. 2012, 125(1), pp. 20-29. Published online Oct. 19, 2011. doi: 10.1093/toxsci/kfr282, pp. 1-11.
Talantov et al., "Novel genes associated with malignant melanoma but not benign melanocytic lesions," Clin Cancer Res., 11(20):7234-7242, Oct. 15, 2005.
Waalkes et al., "Pentamidine: clinical pharmacologic correlations in man and mice," Clin Pharmacol Ther., 11(4):505-512, Jul.-Aug. 1970.
Warters et al., "Differential gene expression in primary human skin keratinocytes and fibroblasts in response to ionizing radiation," Radiat Res., 172(1):82-95, Jul. 2009.
Whelan et al., "A method for the absolute quantification of cDNA using real-time PCR," J. Immunol. Methods, 278(1-2):261-9, Jul. 2003.
Yoo et al., "A Comparison of Logistic Regression, Logic Regression, Classification Tree, and Random Forests to Identify Effective Gene-Gene and Gene-Environmental Interactions "International journal of applied science and technology, Aug. 2012, vol. 2, No. 7, pp. 268-284, especially abstract, p. 274, last para, p. 275, 3rd para, last para.
Yuan et al. "The web-based multiplex PCR primer design software Ultiplex and the associated experimental workflow: up to 100- plex multiplicity" BMC Genomics (last accessed Jan. 2021) 22:835 https://doi.org/10.1186/s12864-021-08149-1.
Zhang et al., Chinese Journal of Gerontology, vol. 35, No. 21, p. 6281-6284).
International Search Report for International Application No. PCT/NL2019/050487, mailed Mar. 3, 2020, 7 pages.
International Written Opinion for International Application No. PCT/NL2019/050487, mailed Mar. 3, 2020, 10 pages.
Timar et al. "Gene signature of the metastatic potential of cutaneous melanoma: too much for too little?", Clinical & Experimental Metastasis, Official Journal of Themetastasis Research Society, Kluwer Academic Publishers, DO, vol. 27, No. 6, Feb. 24, 2010 (Feb. 24, 2010), p. 371-387, XP019815757.
Meves et al. "Tumor Cell Adhesion As a Risk Factor for Sentinel Lymph Node Metastasis in Primary Cutaneous Melanoma" Journal of Clinical Oncology, vol. 33, No. 23, (Aug. 10, 2015) pp. 2509-2515 and appendix.
Sominidi-Damodara et al. . "Stromal gene expression predicts sentinel lymph node metastasis of primary cutaneous melanoma (P)" Poster presented at 15th European Association of Dermato-Oncology (EADO) Congress; Apr. 24-27, 2019.
Riker et al. "The gene expression profiles of primary and metastatic melanoma yields a transition point of tumor progression and metastasis" BMC Medical Genomics, Apr. 28, 2008, vol. 1, Article No. 13, DOI: 10.1186/1755-8794-1-13.
Singh et al. "CXCL8 and its cognate receptors in melanoma progression and metastasis" Future Oncology, Jan. 2010, vol. 6, No. 1, pp. 111-116, DOI: 10.2217/fon.09.128.
Singh et al. "Expression of interleukin-8 in primary and metastatic malignant melanoma of the skin" Melanoma Research, Aug. 1999, vol. 9, No. 4, pp. 383-387, DOI: 10.1097/00008390-199908000-00007.
Haqq et al. "The gene expression signatures of melanoma progression" PNAS (Apr. 26, 2005) vol. 102, No. 17, pp. 6092-6097.
Jaeger et al. "Gene Expression Signatures for Tumor Progression, Tumor Subtype, and Tumor Thickness in Laser-MicrodissectedMelanoma Tissues" Clinical Cancer Research (Feb. 1, 2007) vol. 13, No. 3, pp. 806-815.

(56) References Cited

OTHER PUBLICATIONS

Japanese Notice of Reasons for Refusal for Japanese Application No. 2021-528324, dated Jul. 30, 2024, 7 pages with English translation.
Japanese Notice of Reasons for Refusal for Japanese Application No. 2021-528324, dated Jun. 20, 2023, 8 pages with English translation.
Japanese Notice of Reasons for Refusal for Japanese Application No. 2021-528324, dated Mar. 28, 2024, 6 pages with English translation.
Japanese Notice of Reasons for Refusal for Japanese Application No. 2021-528324, dated Oct. 20, 2023, 9 pages with English translation.

* cited by examiner

GENE SIGNATURES FOR PREDICTING METASTASIS OF MELANOMA AND PATIENT PROGNOSIS

CROSS-REFERENCE TO RELATED APPLICATIONS

This application is a national phase entry under 35 U.S.C. § 371 of International Patent Application PCT/NL2019/050487, filed Jul. 25, 2019, designating the United States of America and published as International Patent Publication WO 2020/022895 A2 on Jan. 30, 2020, which claims the benefit under Article 8 of the Patent Cooperation Treaty to U.S. Patent Application Ser. No. 62/703,221, filed Jul. 25, 2018, Patent Application Ser. No. 62/750,294, filed Oct. 25, 2018, and Patent Application Ser. No. 62/778,777, filed Dec. 12, 2018.

TECHNICAL FIELD

The disclosure provides gene signatures of classifying an individual afflicted with cutaneous melanoma. The "SLN gene signatures" provided herein classify an individual based on prognosis and/or classify an individual as having a metastasis-positive or -negative sentinel lymph node (SLN). The "N-SLN gene signatures" provided herein classify an individual as having a metastasis-positive or -negative non-sentinel lymph node (N-SLN).

BACKGROUND

Cutaneous melanoma is a malignant tumor that arises from the pigment producing melanocytic cells located mostly in the stratum basale of the skin's epidermis. Most lesions appear with signs as described by the ABCDE rules: Asymmetry, Border irregularity, Color variegation, Diameter larger than 6 mm and Evolution, i.e., the tendency to change rapidly (Abbasi N R, Shaw H M, Rigel D S, et al. Early Diagnosis of Cutaneous Melanoma Revisiting the ABCD Criteria. JAMA. 2004; 292(22):2771-2776). The sites are typically asymptomatic, however they can cause itching and/or bleeding—especially in later stages. The detection of suspicious lesions is usually done by self-examination of the skin, which is recommended to perform routinely on the basis of the ABCDE criteria or "ugly duckling signs" (Grob J. The 'Ugly Duckling' Sign: Identification of the Common Characteristics of Nevi in an Individual as a Basis for Melanoma Screening. Arch Dermatol. 1998; 134:103-104). When melanoma is subsequently formally diagnosed by a physician, it is important to determine the specific subtype, since there are multiple clinical and pathological varieties known. The most common form is cutaneous melanoma—a superficial spreading melanoma, which comprises about 70% of cases—and frequently occurs in fair skinned people. The severity of the condition greatly depends on the ability of melanoma cells to migrate out of the primary region. For this reason assessing whether the tumor is localized or has spread to lymph nodes or organs is of paramount significance.

Staging of melanoma is crucial for patient prognosis and to decide on further monitoring and treatment strategies. This is also reflected in the striking contrast in the reported 5-year overall survival numbers in a systematic literature review of 9 European countries: 95%-100% (stage I), 65%-92.8% (stage II), 41%-71% (stage III), and 9%-28% (stage IV). These differences are greatly dependent on the ability of the melanoma to metastasize, opposed to localized melanoma lesions. The accurate discrimination between the different stage classes is important and is most commonly based on the TNM system, referring to the thickness of the primary Tumor (T), the presence and/or extent of tumor cells to the lymph Nodes (N) and the presence of distant Metastasis to other organs (M). When the extent of the primary tumor-stage is evaluated, physicians take into account the tumor thickness but also additional characteristics such as presence of ulceration and the mitotic rate of the primary tumor cells. Normally, only in patients with a high tumor-stage, due to a thick melanoma and/or other variables such as ulceration, the lymph nodes and metastatic spread will be evaluated. As is understood in the art, prognosis refers to a prediction of the medical outcome of the patient. For example, an individual may be classified as having a poor prognosis or a good prognosis. The prognosis of a patient afflicted with melanoma indicates, e.g., likelihood of long-term survival, overall survival, progression free survival, prediction of relapse versus disease remission, and disease progression.

Currently, a widely applied procedure to accurately stratify patients and predict prognosis is to determine the presence of metastases in the SLNs via the SLNB (Sentinel Lymph Node biopsy) method. The management of cutaneous melanoma patients has progressed significantly since the inclusion of lymphatic mapping by the SLNB procedure in the early 1990s (Morton D L, Wen D R, Wong J H, et al. Technical details of intraoperative lymphatic mapping for early stage melanoma. Arch Surg. 1992; 127(4):392-399). The surgical technique has been improved by the implementation of a dual-modality, intraoperative approach using blue dye and a radiotracer with gamma probe detection. In addition, the pathological assessment was upgraded by the employment of serial sectioning of the SLN and immuno-histochemistry. This has resulted in the better identification of the draining first lymph node or group of nodes that is situated in close proximity of the tumor (i.e., the SLN) and is therefore a likely site of metastatic disease. This procedure is also referred to as "sentinel lymph node mapping."

The significant impact of SLN positivity was also shown in the MSLT-1 study, which indicated a difference of 5-year survival rate for patients with tumor-positive SLNs of 72.3% and patients with tumor negative SLNs 90.2%, respectively (Morton D L, Thompson J F, Cochran A J, et al. Sentinel-Node Biopsy or Nodal Observation in Melanoma. New Engl J Med. 2006; 355(13):1307-1317). According to the 8th edition of the American Joint Committee on Cancer (AJCC) melanoma guidelines, the SLNB procedure is recommended for patients with a cutaneous melanoma of ≥0.8 mm (Gershenwald J E, Scolyer R A, Hess K R, et al. Melanoma Staging: Evidence-Based Changes in the American Joint Committee on Cancer Eighth Edition Cancer Staging Manual. CA Cancer J Clin. 2017; 67(6):472-492). For this group of patients, a SLNB procedure is generally performed and further treatment depends on the level of metastases. Within the borderline group, SLNB can be considered, particularly if the melanoma is presented with additional adverse prognostic parameters. For patients with a melanoma thickness of <0.8 mm, the standard treatment is generally considered to be sufficient and SLNB is not recommended. The standard treatment involves local excision of the primary melanoma with wide margins, i.e., surgical resection of the tumor. As used herein, "resection" is understood to mean surgical removal of malignant tissue characteristic of melanoma from a human patient. According to one embodiment, resection shall be understood to mean removal of malignant tissue such that the presence of remaining malignant tissue within the patient is undetectable with available methods.

The rate at which the SLNBs are classified as positive are highly variable and depending to a great extent on the known prognostic factors of the primary tumor. For clinical stage I or II patients the percentage of SLN metastasis is 15-30%, whereas in thin melanomas it is shown to be 5.2%. The current edition of the Melanoma Expert Panel staging guidelines noted the clinical relevance of the subcategorization of T1 melanomas at 0.8 mm. This is based on the detected trend in several survival studies of T1 melanomas that there is a potential clinical intercept in the region of 0.7 to 0.8 mm. However, based on the long term follow up of patients after a SLNB it was shown that regional nodal recurrence takes place in patients with sentinel nodes that were initially tumor-free. This information enabled the calculation of the SLBN test performance, which was established to have an overall false-negative rate of 12.5%. More recently, Morton et al. reported that in intermediate thickness melanomas with a 16.0% positive SLNB, 4.8% had a false negative test result based on recurrence within a 10 years follow-up period. For the 32.9% positive SLNB of the thick melanomas, the false negative rate was 10.3%.

SLNB is not only a method to potentially stage cutaneous melanoma, but is also part of a treatment, which depending on the metastatic classification of the SLN, may or may not be necessary. The SLNB procedure can cause complications for a patient and is costly. Therefore, this procedure is only performed on a select group of patients that are considered to have a higher risk for metastatic spread—from the vast majority of low risk lesions. The risk for metastasis may be assessed by the evaluation of clinicopathologic factors including the tumor invasion depth, known as the Breslow depth, and ulceration of the tumor surface. Ulcerating tumors and melanomas that grow deeper vertically into the skin are associated with higher risk of an adverse outcome. For example, SLN biopsies are not recommended for T1a thin melanomas, 'may be recommended' for a T1b thin-melanoma patients, are recommended for T2 and T3 intermediate thickness melanoma patients and 'may be recommended' for T4 thick-melanoma patients.

Although this concept of using clinicopathologic variables is generally able to identify high risk patients at the extreme ends of the tumor spectrum, this method is not accurate for intermediate lesions. Moreover, there also exceptions within the high—or low risk groups. For example, it is known that 5% of 'thin' melanomas (<0.8 mm invasion depth) metastasize regionally, despite the fact that they are commonly classified as having a low risk profile based on the standard clinicopathologic variables. In order to better distinguish the higher risk lesions from the 95% biologically indolent lesions, additional histologic variables such as the mitotic rate of the tumor (mitoses/mm2) and additional molecular methods such as fluorescence in-situ hybridization (FISH) have been introduced. Unfortunately, these techniques were only partially successfully, resulting in the fact that up to 95% of SLNB are negative. As a result, there is overtreatment with the current diagnostic criteria leading to a majority of patients undergoing unnecessary SLNB surgeries and developing associated side effects that could have been avoided. Vice versa, a fraction of the patients that are currently not referred to a SLNB based on their clinicopathologic factors, can still present with metastases at the SLNs or distant metastasis at a later stage. Therefore, although the SLNB procedure is accurate in identifying SLN positive nodes in resected tissue, the selection of patients eligible for this SLNB procedure remains a challenge.

BRIEF SUMMARY

In certain embodiments, provided herein is a method and system to classify individuals as to their risk of having a metastasis-positive SLN and thus in need of the SLNB procedure. Further described are methods of predicting the prognosis of an individual afflicted with primary cutaneous melanoma. This information is useful, e.g., in order to determine an optimal treatment strategy.

This disclosure provides a method for classifying an individual afflicted with primary cutaneous melanoma, comprising determining in a sample from the individual a gene expression signature, wherein the gene expression signature comprises three or more of the following genes: ITGB3, PLAT, SPP1, GDF15 and IL8. Preferably, wherein the gene expression signature comprises three or more of the following genes: ITGB3, PLAT, GDF15 and IL8, more preferably wherein the gene expression signature comprises ITGB3, PLAT, GDF15 and IL8. Preferably, wherein the gene expression signature comprises three or more of the following genes: GDF15, MLANA, PLAT, IL8, ITGB3, LOXL4, SERPINE2, and TGFBR1, more preferably wherein the gene expression signature comprises three or more of the following genes: GDF15, MLANA, PLAT, IL8, ITGB3, LOXL4, ADIPOQ, SERPINE2, and TGFBR1, more preferably wherein the gene expression signature comprises three or more of the following genes: GDF15, MLANA, PLAT, IL8, ITGB3, LOXL4, ADIPOQ, PRKCB, SERPINE2, ADAM12, LGALS1 and TGFBR1. Also preferred is a gene signature comprising three or more of the following genes: GDF15, MLANA, PLAT, IL8, ITGB3, LOXL4, PRKCB, SERPINE2, ADAM12, LGALS1 and TGFBR1.

Also provided is method for determining a treatment and/or diagnostic work-up schedule for an individual afflicted with cutaneous melanoma, comprising determining in a sample from the individual the level of expression of three or more of the following genes: ITGB3, PLAT, SPP1, GDF15 and IL8 and determining a treatment and/or diagnostic work-up schedule based on the expression levels. Preferably, wherein the gene expression signature comprises three or more of the following genes: ITGB3, PLAT, GDF15 and IL8, more preferably wherein the gene expression signature comprises ITGB3, PLAT, GDF15 and IL8. Preferably, wherein the gene expression signature comprises three or more of the following genes: GDF15, MLANA, PLAT, IL8, ITGB3, LOXL4, SERPINE2, and TGFBR1, more preferably wherein the gene expression signature comprises three or more of the following genes: GDF15, MLANA, PLAT, IL8, ITGB3, LOXL4, ADIPOQ, SERPINE2, and TGFBR1, more preferably wherein the gene expression signature comprises three or more of the following genes: GDF15, MLANA, PLAT, IL8, ITGB3, LOXL4, ADIPOQ, PRKCB, SERPINE2, ADAM12, LGALS1 and TGFBR1. Also preferred is a gene signature comprising three or more of the following genes: GDF15, MLANA, PLAT, IL8, ITGB3, LOXL4, PRKCB, SERPINE2, ADAM12, LGALS1 and TGFBR1

Methods are also provided for predicting the prognosis of an individual afflicted with primary cutaneous melanoma, comprising determining in a sample from the individual a gene expression signature, wherein the gene expression signature comprises three or more of the following genes: ITGB3, PLAT, SPP1, GDF15 and IL8. Preferably, wherein the gene expression signature comprises three or more of the following genes: GDF15, MLANA, PLAT, IL8, ITGB3, LOXL4, SERPINE2, and TGFBR1, more preferably wherein the gene expression signature comprises three or more of the following genes: GDF15, MLANA, PLAT, IL8, ITGB3, LOXL4, ADIPOQ, SERPINE2, and TGFBR1, more preferably wherein the gene expression signature comprises three or more of the following genes: GDF15, MLANA, PLAT, IL8, ITGB3, LOXL4, ADIPOQ, PRKCB, SERPINE2, ADAM12, LGALS1 and TGFBR1. Also preferred is a gene signature comprising three or more of the following genes: GDF15, MLANA, PLAT, IL8, ITGB3, LOXL4, PRKCB, SERPINE2, ADAM12, LGALS1 and TGFBR1

In one aspect the individual is classified as having a metastasis-positive SLN or is classified as having a metastasis-negative SLN. In one aspect, the prognosis of the individual is determined based on the gene expression levels. Preferably, an individual is classified as having a poor prognosis or a good prognosis. The individual can be selected for SLNB based on the classification and/or expression levels. The individual classified as having a metastasis-positive SLN or rather a poor prognosis is treated by performing a SLNB and/or adjuvant treatment.

This disclosure also provides a method for classifying an individual afflicted with primary cutaneous melanoma, comprising determining in a sample from the individual a gene expression signature, wherein the gene expression signature comprises at least one of the following genes: KRT14, SPP1, FN1, and LOXL3.

Further provided is a method for treating an individual afflicted with primary cutaneous melanoma, comprising
  determining in a sample from the individual a gene expression signature, wherein the gene expression signature comprises three or more of the following genes: ITGB3, PLAT, SPP1, GDF15 and IL8,
  classifying the individual as having a metastasis-positive SLN and/or a poor prognosis based on the gene expression signature, and
  treating the individual by performing a SLNB and/or providing a cancer treatment to the individual.

Preferably, wherein the gene expression signature comprises three or more of the following genes: ITGB3, PLAT, GDF15 and IL8, more preferably wherein the gene expression signature comprises ITGB3, PLAT, GDF15 and IL8. Preferably, wherein the gene expression signature comprises three or more of the following genes: GDF15, MLANA, PLAT, IL8, ITGB3, LOXL4, SERPINE2, and TGFBR1, more preferably wherein the gene expression signature comprises three or more of the following genes: GDF15, MLANA, PLAT, IL8, ITGB3, LOXL4, ADIPOQ, SERPINE2, and TGFBR1, more preferably wherein the gene expression signature comprises three or more of the following genes: GDF15, MLANA, PLAT, IL8, ITGB3, LOXL4, ADIPOQ, PRKCB, SERPINE2, ADAM12, LGALS1 and TGFBR1. Also preferred is a gene signature comprising three or more of the following genes: GDF15, MLANA, PLAT, IL8, ITGB3, LOXL4, PRKCB, SERPINE2, ADAM12, LGALS1 and TGFBR1

This disclosure also provides a method for treating an individual afflicted with primary cutaneous melanoma, comprising
  determining in a sample from the individual a gene expression signature, wherein the gene expression signature comprises at least one of the following genes KRT14, SPP1, FN1, and LOXL3,
  classifying the individual as high risk for having a metastasis-positive N-SLN based on the gene expression signature, and
  treating the individual by performing a complete lymph node dissection and/or providing a cancer treatment to the individual.

Also provided is a method for analyzing a gene signature in an individual afflicted with primary cutaneous melanoma, the method comprising
  extracting RNA from a primary cutaneous melanoma lesion from the individual;
  reverse transcribing an RNA transcript of at least three of the following genes ITGB3, PLAT, SPP1, GDF15 and IL8, to produce cDNAs of the RNA transcripts; and
  amplifying the cDNAs to produce amplicons from the cDNAs for determination of expression levels of the RNA transcripts.

This disclosure also provides a method for analyzing a gene signature in an individual afflicted with primary cutaneous melanoma, the method comprising
  extracting RNA from a primary cutaneous melanoma lesion from the individual;
  reverse transcribing an RNA transcript of at least one of the following genes KRT14, SPP1, FN1, and LOXL3, to produce cDNAs of the RNA transcripts; and
  amplifying the cDNAs to produce amplicons from the cDNAs for determination of expression levels of the RNA transcripts.

Further provided is a kit for use in classifying an individual afflicted with primary cutaneous melanoma, the kit comprising primer pairs for amplifying:
  a) three or more of the following genes: ITGB3, PLAT, SPP1, GDF15 and IL8; and/or
  b) at least one of the following genes: KRT14, SPP1, FN1, and LOXL3, and optionally
  c) at least one reference gene.

Preferably, kit comprising primer pairs for amplifying three or more of the following genes: ITGB3, PLAT, GDF15 and IL8, more preferably the kit comprising primer pairs for amplifying ITGB3, PLAT, GDF15 and IL8. Preferably, wherein the gene expression signature comprises three or more of the following genes: GDF15, MLANA, PLAT, IL8, ITGB3, LOXL4, SERPINE2, and TGFBR1, more preferably wherein the gene expression signature comprises three or more of the following genes: GDF15, MLANA, PLAT, IL8, ITGB3, LOXL4, ADIPOQ, SERPINE2, and TGFBR1, more preferably wherein the gene expression signature comprises three or more of the following genes: GDF15, MLANA, PLAT, IL8, ITGB3, LOXL4, ADIPOQ, PRKCB, SERPINE2, ADAM12, LGALS1 and TGFBR1. Also preferred is a gene signature comprising three or more of the following genes: GDF15, MLANA, PLAT, IL8, ITGB3, LOXL4, PRKCB, SERPINE2, ADAM12, LGALS1 and TGFBR1.

DETAILED DESCRIPTION

Figure 1:
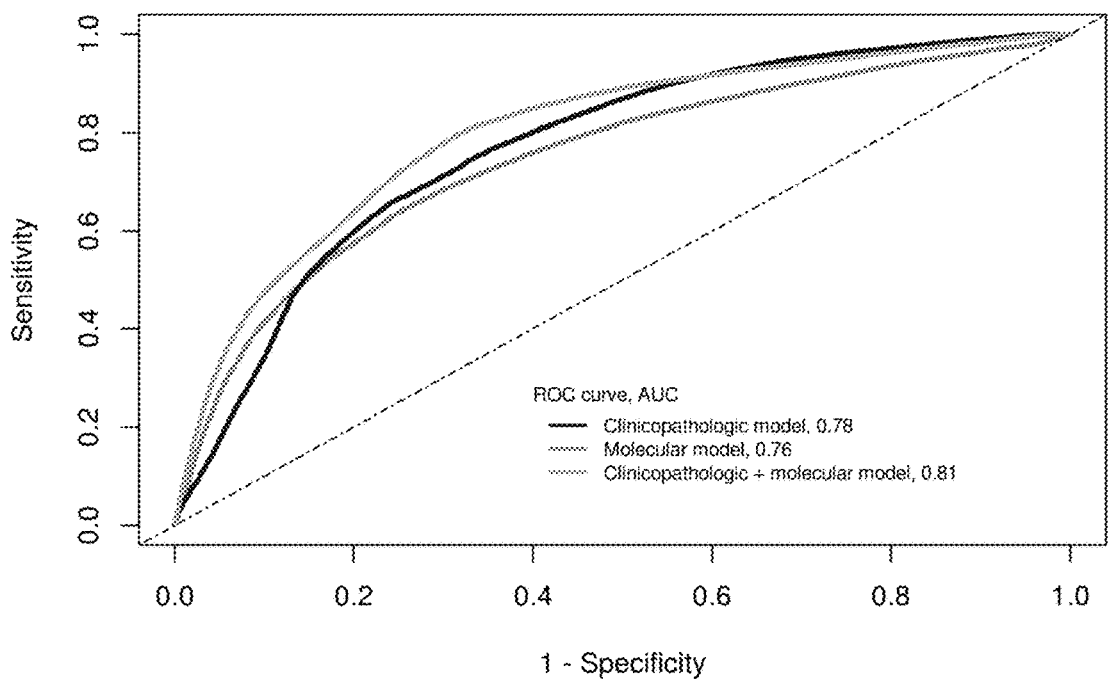
FIG. 1: Average ROC curves for the logistic regression classifiers trained in DLCV on: 1) ITGB3, PLAT, SPP1, GDF15 and IL8 gene signature (molecular model), 2) clinic-pathological variables (age and Breslow depth), 3) ITGB3, PLAT, SPP1, GDF15 and IL8 gene signature and clinic-pathological variables combined. The x-axis represents the false positive discovery rate (i.e., 1–specificity), the y-axis the true discovery rate (i.e., sensitivity).

The disclosure provides, in part, methods, kits, gene signatures and means of detecting such gene signatures to perform an analysis of a primary cutaneous melanoma tumor tissue sample. In one aspect, the disclosure provides an "SLN gene signature." The SLN gene signature classifies an individual afflicted with primary cutaneous melanoma, in particular, the gene signature classifies the risk of the individual having a metastasis-positive SLN and/or a poor prognosis. This risk assessment is useful for physicians and patients when deciding whether an SLNB procedure and/or an alternative treatment strategy is warranted. This assessment is also useful when selecting patients for inclusion in clinical trials.

As used herein, the SLN is the first lymph node (or set of first lymph nodes) to receive lymphatic drainage from a tumor and is the first lymph node (or set of first lymph nodes) where cancer is likely to spread. An N-SLN is a lymph node that is not the first lymph node to receive lymphatic drainage from a tumor. Such N-SLN is often a node in the same nodal basin or in close proximity to the SLN.

In some embodiments, the gene signature classifies the risk of metastasis-positive SLN. In some embodiments, the methods disclosed herein classify an individual as having a metastasis-positive SLN or having a metastasis-negative SLN. In some embodiments, the gene signatures classifies the prognosis of the individual. As used herein, prognosis refers to the prediction of a medical outcome and can be based on measures such as overall survival, melanoma specific survival, recurrence free survival, relapse free survival and distant relapse free survival.

One advantage of the SLN gene signature is that it can reduce the number of surgical procedures for patients classified as metastasis-negative SLN (and/or classified as having a good prognosis). In particular, patients having intermediate lesions would likely have undergone an SLNB procedure with a good chance that the SLN was, in fact, metastasis negative. Accurate classification of such patients with the SLN gene signature avoids the need for an SLNB procedure and can be used to replace the SLNB as the current standard of care for intermediate lesions. The reduction of unnecessary SLNBs reduces the overall health care costs and reduces the number of patients suffering from complications caused by the removal of SLNs. In addition, the classification of an individual as SLN metastasis positive or negative also provides prognostic information and can be used to for determining a treatment or diagnostic work-up schedule.

Surprisingly, the SLN gene signature is able to more accurately predict prognosis than the standard of care SLN biopsies (see Example 7). While not wishing to be bound by theory, one possible explanation as to the improved prognostic power of the gene signature over SLN biopsies relates to the technical limitation of performing such biopsies (e.g., identifying the correct lymph node to biopsy, limitations of tumor cell detection, human error in processing/classifying samples). In addition to or in the alternative, the disclosed gene signature may be able to predict SLN metastasis at a stage before it can be detected in a biopsy (e.g., the tumor has metastasized and tumor cells are in route to the SLN). In this regard, the SLN signature can be used to replace the SLNB as a criterion for inclusion in clinical trials and/or additional treatment.

A further advantage of the SLN gene signature is that it can identify patients with thin thickness melanoma that in current standard of care may not be eligible for SLNB based on clinical parameters, but based on the gene signature are high risk for metastasis-positive SLN. In particular, the gene signature will greatly increase the identification of metastasis-positive SLN in thin (<0.8 mm) melanoma patients, that are currently not eligible for SLNB procedures according to the guidelines. The early detection and treatment of such patients will increase progression free and overall survival for this patient sub-population.

The examples disclosed herein demonstrate that a gene expression signature (i.e., the SLN gene signature) comprising one or more of the following genes: ITGB3, PLAT, SPP1, GDF15 and IL8, is useful to classify individuals and predict prognosis and, in particular, to classify the SLN as metastasis positive or negative. Accordingly, in one aspect the disclosure provides a gene signature comprising one or more, preferably two or more, more preferably three or more of the following genes: ITGB3, PLAT, SPP1, GDF15 and IL8. Suitable gene signatures include the following combinations: ITGB3 and PLAT; ITGB3 and SPP1; ITGB3 and GDF15; ITGB3 and IL8; PLAT and SPP1; PLAT and GDF15; PLAT and IL8; SPP1 and GDF15; SPP1 and IL8; GDF15 and IL8. In some embodiments, the gene signature comprises ITGB3, PLAT, and one or more of SPP1, GDF15 and IL8. In some embodiments, the SLN gene signature comprises three or more of the following genes: ITGB3, PLAT, SPP1, GDF15 and IL8. In some embodiments, the SLN gene signature comprises four or more of the following genes: ITGB3, PLAT, SPP1, GDF15 and IL8. In some embodiments, the SLN gene signature comprises all the following genes: ITGB3, PLAT, SPP1, GDF15 and IL8. In some embodiments, the gene expression signature comprises three or more of the following genes: ITGB3, PLAT, GDF15 and IL8, more preferably wherein the gene expression signature comprises ITGB3, PLAT, GDF15 and IL8. Preferably, wherein the gene expression signature comprises GDF15, MLANA, PLAT, IL8, ITGB3, LOXL4, SERPINE2, and TGFBR1, more preferably wherein the gene expression signature comprises GDF15, MLANA, PLAT, IL8, ITGB3, LOXL4, ADIPOQ, SERPINE2, and TGFBR1, more preferably wherein the gene expression signature comprises GDF15, MLANA, PLAT, IL8, ITGB3, LOXL4, ADIPOQ, PRKCB, SERPINE2, ADAM12, LGALS1 and TGFBR1.

In some embodiments the gene signature comprises at least three, at least four, or at least five of the following: ITGB3, PLAT, GDF15, SPP1 and IL8. Preferably, the gene signature comprises ITGB3, PLAT, GDF15, and IL8.

In some embodiments the gene signature comprises at least three, at least four, at least five, at least six, at least seven, at least eight or all of the following: GDF15, MLANA, PLAT, IL8, ITGB3, LOXL4, ADIPOQ, SERPINE2, and TGFBR1. The inventors also demonstrate that a gene signature lacking ADIPOQ performs similarly. Therefore, in some embodiments the gene signature comprises at least three, at least four, at least five, at least six, at least seven, or all of the following: GDF15, MLANA, PLAT, IL8, ITGB3, LOXL4, ADIPOQ, SERPINE2, and TGFBR1. In some embodiment the gene signature comprises:

ITGB3, PLAT, GDF15, IL8, MLANA, and one or both of LOXL4 and SERPINE2;
ITGB3, PLAT, GDF15, IL8, MLANA, and one or both of SERPINE2 and TGFBR1;
ITGB3, PLAT, GDF15, IL8, and one or both of MLANA and TGFBR1;
ITGB3, PLAT, GDF15, IL8, and one or both of TGFBR1 and SERPINE2;
ITGB3, PLAT, GDF15, IL8, SERPINE2, and one or both of LOXL4 and TGFBR1
ITGB3, PLAT, GDF15, IL8, LOXL4;
ITGB3, PLAT, GDF15, IL8, SERPINE2:
ITGB3, PLAT, GDF15, IL8, TGFBR1; or
ITGB3, PLAT, GDF15, IL8, MLANA.

In some embodiments the gene signature comprises at least three, at least four, at least five, at least six, at least seven, at least eight, at least nine, at least ten, at least 11, or all of the following: GDF15, MLANA, PLAT, IL8, ITGB3, LOXL4, ADIPOQ, PRKCB, SERPINE2, ADAM12, LGALS1 and TGFBR1. In some embodiments the gene signature comprises at least three, at least four, at least five, at least six, at least seven, at least eight, at least nine, at least ten, or all of the following: GDF15, MLANA, PLAT, IL8, ITGB3, LOXL4, PRKCB, SERPINE2, ADAM12, LGALS1 and TGFBR1.

In some embodiments, the gene signature consists of the above mentioned genes. As is understood to a skilled person, when the SLN gene signature consists of the above mentioned genes, methods for performing an analysis may comprise measuring the expression of additional genes (e.g., for normalization) but only the gene signature is used to classify an individual.

The ITGB3 gene encodes Integrin beta-3. An exemplary Homo sapiens mRNA sequence can be found at the NCBI database under NM_000212.2 (17 Jun. 2018).

The PLAT gene encodes plasminogen activator, tissue type. An exemplary Homo sapiens mRNA sequence can be found at the NCBI database under NM_001319189.1 (1 Jul. 2018).

The SPP1 gene encodes secreted phosphoprotein 1. An exemplary Homo sapiens mRNA sequence can be found at the NCBI database under NM_001040058.1 (24 Jun. 2018).

The GDF15 gene encodes growth differentiation factor 15. An exemplary Homo sapiens mRNA sequence can be found at the NCBI database under NM_004864.3 (17 Jun. 2018).

The IL8 gene encodes interleukin 8. An exemplary Homo sapiens mRNA sequence can be found at the NCBI database under AF043337.1 (1 Feb. 2001).

The MLANA gene encodes melan-A. An exemplary Homo sapiens mRNA sequence can be found at the NCBI database under NM_005511 (20 Oct. 2018).

The LOXL4 gene encode lysyl oxidase like 4. An exemplary Homo sapiens mRNA sequence can be found at the NCBI database under NM_032211 (22 Nov. 2018).

The ADIPOQ gene encodes adiponectin, C1Q and collagen domain containing. An exemplary Homo sapiens mRNA sequence can be found at the NCBI database under NM_004797 (2 Dec. 2018).

The PRKCB gene encodes protein kinase C beta. An exemplary Homo sapiens mRNA sequence can be found at the NCBI database under NM_212535 (12 Nov. 2018).

The SERPINE2 gene encodes serpin family E member 2. An exemplary Homo sapiens mRNA sequence can be found at the NCBI database under NM_006216 (17 Nov. 2018).

The ADAM12 gene encodes ADAM metallopeptidase domain 12. An exemplary Homo sapiens mRNA sequence can be found at the NCBI database under NM_003474 (5 Aug. 2018).

The LGALS1 gene encodes galectin 1. An exemplary Homo sapiens mRNA sequence can be found at the NCBI database under NM_002305 (22 Nov. 2018).

The TGFBR1 gene encodes transforming growth factor beta receptor 1. An exemplary Homo sapiens mRNA sequence can be found at the NCBI database under NM_004612 (28 Oct. 2018).

Figure 3:
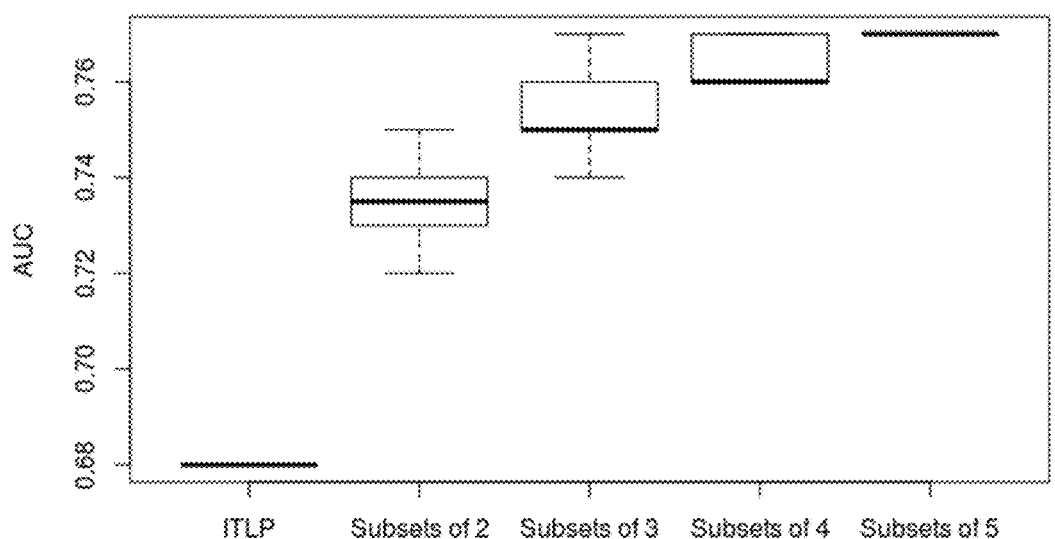
FIG. 3: Boxplots of the area under the ROC curves for the different ITGB3, PLAT, SPP1, GDF15 and IL8 gene subsets, for the full set of 5 ITGB3, PLAT, SPP1, GDF15 and IL8 genes and for the ITLP signature.

The disclosure further provides methods of classifying an individual comprising determining in a sample the SLN gene signature. In some embodiments, the individual may be classified as having metastasis-positive SLN or metastasis-negative SLN. In another embodiment, the individual may be classified as having good or poor prognosis. A gene signature associated with SLN metastasis was previously reported (Meves et al. J Clinical Oncology 2015 33:2509-2516). The algorithm uses the clinicopathological variables age, Breslow depth and ulceration combined with primary melanoma gene expression of four genes ITGB3, LAMB1, PLAT and TP53, to predict SLN metastasis. As shown in FIG. 3, the present SLN gene signature outperforms the previously reported signature.

In one aspect, the disclosure provides an "N-SLN gene signature." The N-SLN gene signature classifies an individual afflicted with primary cutaneous melanoma, in particular, the gene signature classifies the risk of the individual having a metastasis-positive non-sentinel lymph node (N-SLN). This risk assessment is useful for physicians and patients when deciding treatment options and to determine the patient's prognosis.

In some embodiments, the N-SLN gene signature classifies the risk of metastasis-positive N-SLN. An individual may be classified as having metastasis-positive N-SLN or metastasis-negative N-SLN. The invasion of tumor cells to distantly located lymph nodes is an indicator of poor prognosis and suggests the use of more aggressive forms of treatment. Early detection and treatment is expected to improve patient outcome.

The examples disclosed herein demonstrate that a gene expression signature (i.e., the N-SLN gene signature) comprising one or more of the following genes: KRT14, SPP1, FN1, LOXL3, is useful to classify individuals and, in particular, to determine risk of metastasis-positive N-SLN. Accordingly, in one aspect the disclosure provides a gene signature comprising at least one of the following genes: KRT14, SPP1, FN1, LOXL3. In some embodiments, the gene signature comprises at least two or at least three of the following genes: KRT14, SPP1, FN1, LOXL3. In some embodiments, the N-SLN gene signature comprises or consists of KRT14, SPP1, FN1, LOXL3. In some embodiments, the gene signature consists of the above mentioned genes. As is understood to a skilled person, when the N-SLN gene signature consists of the above mentioned genes, methods for performing an analysis may comprise measuring the expression of additional genes (e.g., for normalization) but only the gene signature is used to classify an individual. In some embodiments, the N-SLN gene signature is determined in an individual who is suffering from a recurrence/relapse of cutaneous melanoma and/or has already received an SLN biopsy.

The KRT14 gene encodes keratin 14. An exemplary *Homo sapiens* mRNA sequence can be found at the NCBI database under NM_000526.4 (17 Jun. 2018).

The FN1 gene encodes fibronectin 1. An exemplary *Homo sapiens* mRNA sequence can be found at the NCBI database under NM_001306129.1 (3 Jun. 2018).

The LOXL3 gene encodes lysyl oxidase like 3. An exemplary *Homo sapiens* mRNA sequence can be found at the NCBI database under NM_001289165.1 (30 Jun. 2018).

The disclosure further provides methods of classifying an individual comprising determining in a sample the N-SLN gene signature. In some embodiments, the individual may be classified as having metastasis-positive N-SLN or metastasis-negative N-SLN. In some embodiments, methods are provided, which determine both the SLN gene signature and the N-SLN gene signature.

Analysis of the gene signatures disclosed herein may be performed in any individual, including mammals and humans, although humans are preferred. In some embodiments, the individual has been diagnosed with a cutaneous melanoma of T1-T3. In some embodiments, the individual has not yet undergone a biopsy of the SLN of the primary melanoma, in particular, when the gene signature is the SLN gene signature. The gene signature is particularly useful to classify individuals with a young age, with a high mitotic rate (e.g., above 2/mm$^2$), previous history of disease, familial history of disease with poor outcome, and/or with lymph vascular invasion.

The gene expression signatures are useful for predicting the risk or likelihood that tumor cells have metastasized to an SLN or N-SLN. As is clear to a skilled person, the classification of an individual refers to a probability or "risk of" and not that 100% of all patients that are predicted to be at risk will in fact have detectable metastases (referred to as sensitivity or Positive Percent Agreement) nor that 0% of all patients that are predicted not to have metastases will in fact be clear of metastases (referred to as specificity or Negative Percent Agreement). As disclosed in the examples, the SLN and N-SLN gene expression signatures exhibit high performance levels for both sensitivity and specificity. As disclosed in the examples, the SLN gene signature is able to better predict the prognosis of an individual afflicted with melanoma than the standard of care SLN biopsy. The disclosure thus demonstrates that the gene expression signature is useful for predicting the prognosis of an individual.

As is known to a skilled person, the load of metastasis as measured by the volume of metastatic disease can differ among individuals. In some embodiments, metastasis refers to the presence of tumor cell clusters and does not include lymph nodes that only contain isolated or rare tumor cells. In some embodiments, metastasis refers to the presence of cell clusters that are at least 0.1 mm in diameter either with or without extra-capsular extension.

It is within the purview of one of skill in the art to obtain a suitable sample for determining gene expression. Suitable samples include primary cutaneous melanoma lesion biopsies. Such biopsies include a resected lesion (e.g., wide-excision removal of a tumor). Samples may be processes or preserved by any means known in the art to be compatible with gene expression profiling. For example, the sample may be a formalin fixed paraffin embedded primary cutaneous melanoma lesion biopsy, as well as a frozen sample.

Preferably, the sample is an RNA-containing sample. General methods for mRNA extraction are well known in the art and are disclosed in standard textbooks of molecular biology, including Ausubel et al. (1997) Current Protocols of Molecular Biology, John Wiley and Sons. Methods for RNA extraction from paraffin embedded tissues are disclosed, for example, in Rupp & Locker (1987) Lab Invest. 56:A67, and De Andres et al., BioTechniques 18:42044 (1995). In particular, RNA isolation can be performed using purification kit, buffer set and protease from commercial manufacturers, such as Qiagen, according to the manufacturer's instructions (QIAGEN Inc., Valencia, Calif.). For example, total RNA from cells in culture can be isolated using Qiagen RNeasy mini-columns. Numerous RNA isolation kits are commercially available and can be used in the methods of this disclosure.

The methods disclosed herein comprise determining a gene expression signature. In particular, the methods comprise determining a level of gene expression. Gene expression levels can be determined by measuring the level of nucleic acid or protein expression. Preferably, the level of mRNA expression is determined. In some embodiments, nucleic acid or protein is purified from the sample and gene expression is measured by nucleic acid or protein expression analysis. The level of protein expression can be determined by any method known in the art including ELISAs, immunocytochemistry, flow cytometry, Western blotting, proteomic, and mass spectrometry.

Preferably, nucleic acid expression levels are determined. The level of nucleic acid expression may be determined by any method known in the art including RT-PCR, quantitative PCR, Northern blotting, gene sequencing, in particular, RNA sequencing, and gene expression profiling techniques. Representative methods for sequencing-based gene expression analysis include Serial Analysis of Gene Expression (SAGE), and gene expression analysis by massively parallel signature sequencing (MPSS).

Preferably, the nucleic acid is RNA, such as mRNA or pre-mRNA. As is understood by a skilled person, the level of RNA expression determined may be detected directly or it may be determined indirectly, for example, by first generating cDNA and/or by amplifying the RNA/cDNA. In some embodiments, a primary melanoma sample is obtained; RNA is extracted from the tissue sample; followed by reverse transcribing an RNA transcript of the genes of interest (e.g., biomarkers and housekeeping genes) to produce cDNAs of the RNA transcripts; and amplifying the cDNAs to produce amplicons from the cDNAs for determination of expression levels of the RNA transcripts.

In some embodiments, gene expression may be determined by NanoString gene expression analysis. NanoString is a multiplexed method for detecting gene expression and provides a method for direct measurement of mRNAs without the use of transcription or amplification. NanoString and aspects thereof are described in Geiss et al., "Direct multiplexed measurement of gene expression with color-coded probe pairs" Nature Biotechnology 26, 317-325 (2008);

The level of expression need not be an absolute value but may rather be a normalized expression value or a relative value. For example, the levels of expression can be normalized against housekeeping or reference gene expression. Such genes include ABCF1, ACTB, ALAS1, CLTC, G6PD, GAPDH, GUSB, HPRT1, LDHA, PGK1, POLR1B, POLR2A, RPL19, RPLPO, SDHA, TBP, and TUBB.

Normalization is also useful when expression is determined based on microarray data. Normalization allows for correction for variation within microarrays and across samples so that data from different chips can be simultaneously analyzed. The robust multi-array analysis (RMA) algorithm may be used to pre-process probe set data into gene expression levels for all samples. (Irizarry R A, et al., Biostatistics (2003) and Irizarry R A, et al., Nucleic Acids Res. (2003)). In addition, Affymetrix's default preprocessing algorithm (MAS 5.0), may also be employed. Additional methods of normalizing expression data are described in US20060136145.

In some embodiments, the expression levels are determined using Real-time PCR (i.e., quantitative PCR or qPCR). In real-time PCR (qPCR), reactions are characterized by the point in time during cycling when amplification of a target is first detected rather than the amount of target accumulated after a fixed number of cycles. This point when the signal is first detected is referred to as the threshold cycle (Ct).

In some embodiments, expression of the gene signature is quantified relative to each other by normalization against the expression of housekeeping genes by subtracting the Ct of the signature genes from the averaged Ct of the housekeeping genes. In some embodiments, these ΔCt values are then combined with the patient's age and melanoma lesion's Breslow Depth in an algorithm to calculate the prediction of SLN metastasis. In some embodiments, the housekeeping genes used for normalization are ACTB, RPLP0 and RPL8. However, other housekeeping genes may be used. The ratios of the gene expression signals may be subsequently combined with clinical variables in an algorithm to calculate the prediction of the outcome of a patient SLNB. Results are expressed as a binary classification (negative or positive). A "negative" result would indicate that the individual has a low risk of metastasis-positive SLN or rather that the individual has a good prognosis, whereas a "positive" result would indicate that the individual has a high risk of a metastasis-positive SLN or rather a poor prognosis.

The methods described herein classify an individual based on gene expression signatures. In some embodiments, the differential expression of one or more genes of the signature in an individual indicates that the individual is at risk of metastasis, or rather, indicates the prognosis of the individual. As used herein, "differentially-expressed" means that the measured expression level in a subject differs significantly from a reference. The reference may be a single value or a numerical range. It is within the purview of a skilled person to determine the appropriate reference value. In some embodiments, the reference value is a predetermined value. In some embodiments, the reference value is the average of the expression value in a particular patient class. For example, the reference value may be the average of the expression value in a class of patients that have clinically confirmed SLN metastasis (or for the N-SLN signature, patients that have clinically confirmed N-SLN metastasis). A reference value may also be in the form of or derived from an equation. It is within the purview of one skilled in the art to determine whether the expression level in the patient differs "significantly" from a reference.

In an exemplary embodiment, the reference value is determined from a cohort of melanoma patients who underwent an SLNB as described in the examples. It is clear to a skilled person that data from similar studies may also be used.

The strength of the correlation between the expression level of a differentially-expressed gene and a specific patient response class may be determined by a statistical test of significance. For example, a chi square test may be used to assign a chi square value to each differentially-expressed marker, indicating the strength of the correlation of the expression of that marker to a specific patient response class. Similarly, the T-statistics metric and the Wilkins' metric both provide a value or score indicative of the strength of the correlation between the expression of the marker and its specific patient response class. In addition, SAM or PAM analysis tools may be used to determine the strength of correlations.

In some embodiments, the gene expression signature from an individual is compared to the reference expression signature to determine whether the gene expression signature from an individual is sufficiently similar to the reference profile. Alternatively, the gene expression signature from an individual is compared to a plurality of reference expression signatures to select the reference expression profile that is most similar to the gene expression profile from an individual. Any method known in the art for comparing two or more data sets to detect similarity between them may be used to compare the gene expression signature from an individual to the reference expression profiles.

In machine learning and statistics, classification refers to identifying to which set of categories a new observation belongs, on the basis of a training set of data containing observations (or instances) whose category membership is known. An algorithm that implements classification, especially in a concrete implementation, is known as a classifier. Many classifiers are known in the art, with linear or non-linear classifier boundaries, such as but not limited to: ClaNC, nearest mean classifier, weighted voting method, simple Bayes classifier, linear discriminant analysis (LDA), quadratic discriminant analysis (QDA), Support Vector Machines (SVM), or the k-nearest neighbor (k-nn) classifier. In a preferred embodiment, a logistic regression classifier is used. Exemplary embodiments implementing a logistic regression classifier are described in the examples.

As is understood by a skilled person, training of a gene expression signature can be performed to favor sensitivity or specificity. Sensitivity refers to the proportion of actual positives that are correctly identified as such and high sensitivity is desired to avoid false negatives (e.g., patients classified as metastasis negative that are in fact positive). Specificity refers to the proportion of actual negatives that are correctly identified as such and high specificity is desired to avoid false positives (e.g., patients classified as metastasis positive that are in fact negative). Preferably, the classifiers are trained for high sensitivity in order to identify individuals with metastasis.

In some embodiments, the methods for classifying an individual further utilize the age of the individual and/or the Breslow depth of the tumor. Optionally the ulceration and/or the mitotic rate may be determined. Breslow depth is measured from the top of the granular layer of the epidermis (or, if the surface is ulcerated, from the base of the ulcer) to the deepest invasive cell across the broad base of the tumor (dermal/subcutaneous). Ulceration refers to the sloughing of dead tissue and is thought to reflect rapid tumor growth, leading to the death of cells in the center of the melanoma. The mitotic rate may be measured by examining the excised tumor and counting the number of cells exhibiting mitosis. The higher the mitotic count, the more likely the tumor is to have metastasized. In particular, embodiments, a combined model is used, which comprises the gene signature comprising GDF15, MLANA, PLAT, IL8, ITGB3, LOXL4, SERPINE2 and TGFBR1 and the clinical variables of age and Breslow depth. In some embodiments, the gene signature additionally comprises AIDPOQ.

The disclosure also provides kits for determining the gene expression signatures disclosed herein. In some embodiments, the kits comprise primer pairs for performing qPCR on the gene signatures disclosed herein. In some embodiments the kits comprise primer pairs for performing qPCR on two or more, preferably three or more, of the following genes: ITGB3, PLAT, SPP1, GDF15 and IL8; and/or one or more of the following genes: KRT14, SPP1, FN1, LOXL3. In some embodiments the kits comprise primer pairs for housekeeping genes, such as ACTB, RPLP0 and RPL8. In some embodiments, the kits further comprising one or more of the following: DNA polymerase, deoxynucleoside triphosphates, buffer, and Mg2+. In some embodiments the kit comprises primer pairs for amplifying three or more of the following genes: ITGB3, PLAT, GDF15 and IL8, more preferably the kit comprising primer pairs for amplifying ITGB3, PLAT, GDF15 and IL8. Preferably, wherein the gene expression signature comprises GDF15, MLANA, PLAT, IL8, ITGB3, LOXL4, SERPINE2, and TGFBR1, more preferably wherein the gene expression signature comprises GDF15, MLANA, PLAT, IL8, ITGB3, LOXL4, ADIPOQ, SERPINE2, and TGFBR1, more preferably wherein the gene expression signature comprises GDF15, MLANA, PLAT, IL8, ITGB3, LOXL4, ADIPOQ, PRKCB, SERPINE2, ADAM12, LGALS1 and TGFBR1. In some embodiments, the kits comprise a control nucleic acid for one or more, preferably for each, primer pair. Preferably, the control nucleic acid is cDNA and more preferably the cDNA corresponds to a sequence that spans at least one intron/exon boundary of the respective gene. Such cDNA is useful to distinguish gene expression from genomic contamination. In some embodiments, one or more primers of the primer pair are chemically modified. Such modified primers include fluorescently or radioactively labeled primers.

The results of the gene expression analyzes disclosed herein are useful for determining a diagnostic work-up schedule. For example, an individual classified as have metastasis-positive SLN or a poor prognosis can undergo a SLNB. In some embodiments, immunotherapy is administered to an individual that is predicted to be SLN positive or rather predicted to have poor prognosis. A subsequent SLNB readout can be a measure of response to the immunotherapy.

Based on the gene expression signatures, an appropriate treatment regime can be determined. As used herein, the terms "treatment," "treat," and "treating" refer to reversing, alleviating, delaying the onset of, or inhibiting the progress of melanoma, or one or more symptoms thereof. In some embodiments, individuals classified as having metastatic-positive SLN or rather a poor prognosis may be treated with SLNB. The location of the SLN may be determined based on the location of the melanoma and/or with methods such as "SLN mapping," as known to a skilled person and described herein.

A metastasis-positive N-SLN can be treated by performing a surgical procedure, for instance, a surgical lymph node dissection. Metastatic-N-SLN may be treated with a complete lymph node dissection and/or other therapies for treating melanoma. In some embodiments, a cancer treatment is administered to the individual. In some embodiments, an "adjuvant treatment" is administered to an individual. Adjuvant treatment, as used herein, refers to the administration of one or more drugs to a patient after surgical resection of one or more cancerous tumors, where all detectable and respectable disease (e.g., cancer) has been removed from the patient, but where there remains a statistical risk of relapse. Adjuvant treatment is useful to diminish the likelihood or the severity of reoccurrence or the disease.

Known melanoma therapies, which may be indicated based on the gene expression signatures, include:
  Chemotherapy: e.g., dacarbazine (DTIC), temozolomide (Temodal), carboplatin (Paraplatin, Paraplatin AQ), paclitaxel (Taxol), cisplatin (Platinol AQ), and vinblastine and (Velbe);
  Targeted therapy drugs: e.g., BRAF inhibitors (vemurafenib (Zelboraf) and dabrafenib (Tafinlar)) and MEK inhibitors (cobimetinib (Cotellic) and trametinib (Mekinist));
  Radiation therapy;
  Immunotherapy: e.g., cytokines (e.g., Interferon alfa-2b or Interleukin-2) immune checkpoint inhibitors (e.g., Ipilimumab (Yervoy), Nivolumab (Opdivo), Pembrolizumab (Keytruda)), or oncolytic immunotherapy.

The administration of a suitable drug therapy may be administered by any appropriate route. Suitable routes include oral, rectal, nasal, topical (including buccal and sublingual), vaginal, and parenteral (including subcutaneous, intramuscular, intravenous, intradermal, intrathecal, and epidural).

As used herein, "to comprise" and its conjugations is used in its non-limiting sense to mean that items following the word are included, but items not specifically mentioned are not excluded. In addition the verb "to consist" may be replaced by "to consist essentially of" meaning that a compound or adjunct compound as defined herein may comprise additional component(s) than the ones specifically identified, the additional component(s) not altering the unique characteristic of this disclosure.

The articles "a" and "an" are used herein to refer to one or to more than one (i.e., to at least one) of the grammatical object of the article. By way of example, "an element" means one element or more than one element.

The word "approximately" or "about" when used in association with a numerical value (approximately 10, about 10) preferably means that the value may be the given value of 10 more or less 1% of the value.

This disclosure is further explained in the following examples. These examples do not limit the scope of this disclosure, but merely serve to clarify this disclosure.

EXAMPLES

Example 1: Gene Signature to Predict SLN Metastasis Status

A cohort of 813 consecutive melanoma patients was assembled who underwent SLN biopsy at tertiary care centers. Outcomes of interest were SLN and metastasis identified histologically at SLN biopsy. Expression of 29 metastasis-promoting stromal response genes in primary melanoma diagnostic biopsy tissue was by polymerase chain reaction. Logistic regression with regularization was applied to clinicopathologic variables and molecular data in a double-loop-cross-validation (DLCV) training-validation scheme.

Clinical Dataset

Out of the above clinical variables only 6 show significant difference between SLNB positive and SLNB negative:
Age,
Breslow Depth
Ulceration
Mitotic rate
Clark level
Angio-lymphatic invasion Of the 6 variables, only age, Breslow Depth, ulceration and mitotic rate were considered, but not Clark level and angio-lymphatic invasion, since the latter variables are not always available and their quality may differ depending on the health care provider performing the SLNB.

Gene expression was quantified by delta Ct and not by Copy number as in Meves et al. 2015, since there is no significant difference in performance in using copy number with the applicant's signature but only an increase experimental burden. KRT14 background correction has also been dropped compared to Meves et al. 2015. The so-called ITLP-normalization has been also dropped since it is based on ad-hoc over-ruling of the measured expression and it does require many arbitrary parameters mostly in the form of thresholds.

Among the patients with positive sentinel lymph node biopsy, the load of the metastasis, as measured by the volume of metastatic disease can differ significantly:

| Volume | Definition |
| --- | --- |
| 1 | Isolated tumor cells or rare tumor cells only |
| 2 | Cell clusters < 0.1 mm in diameter |
| 3 | Cell clusters >= 0.1 mm w/o extra-capsular extension |
| 4 | Cell clusters >= 0.1 mm with extra-capsular extension |
| 9 | Unknown |

It remains controversial whether samples having cell clusters less than 0.1 mm in diameter should be considered metastatic positive and from a clinical viewpoint are generally considered negative. Therefore, it was decided to exclude from the training set of the classifier the 43 patients out of 813 with volume of metastatic disease equal to 1 or 2, and evaluated separately the performance of classifier on this set. The following 29 genes were measured:

KRT14, MLANA, MITF, ITGB3, PLAT, LAMB1, TP53, AGRN, THBS2, PTK2, SPP1, COL4A1, CDKN1A, CDKN2A, PLOD3, GDF15, FN1, TNC, THBS1, CTGF, LOXL1, LOXL3, ITGA5, ITGA3, ITGA2, CSRC, CXCL1, IL8, LAMB.

Performance Measures

In order to evaluate the performance of a classifier, contingency tables have been constructed. From these contingency tables two criteria have been derived, namely the PPA (Positive Percent Agreement) and NPA (Negative Percent Agreement): which are defined as:

$$PPA = 100 \frac{TP}{TP+FN}$$

and $$NPA = 100 \frac{TN}{TN+FP}$$

where TP represents the number of True Positives, FN the number of False Negatives, TN the number of True Negatives, and FP the number of False Positives. The formulas for the PPA and NPA criteria are equivalent to the sensitivity and specificity, respectively. However, since a comparison is made relative to a non-golden standard reference (FISH data), the terms PPA and NPA will be used.

To optimize the training of a classifier, a single performance criterion is required that should be maximized (or minimized in case of an error criterion). To this end, the average of the PPA and NPA will be used:

$$p = \frac{PPA+NPA}{2} = 100 \frac{\frac{FN}{TP+FN} + \frac{FP}{FP+TN}}{2}$$

where p indicates the performance. p=50 implies random performance, and p=100 implies perfect classification.

Other Performance Measures:
Negative predictive value
Positive predictive value
Accuracy
Balanced accuracy
Log likelihood ratio for negative outcome
Log likelihood ratio for positive outcome
Area under ROC curve.

Classifiers

All classifiers are trained on the expression levels of the 29 genes, on the clinical-pathological variables and on both.

Classifier: Logistic Regression with Penalized Maximum Likelihood

Logistic regression classifiers were used as implemented in the R package glmnet. The parameters are estimated by maximum likelihood estimation with a L1-norm penalty term (LASSO regularization) in order to get a parsimonious representation.

Double Loop Cross Validation of the Classifier

Wessels et al. [Wessels et al. Bioinformatics, Volume 21, Issue 19, 2005, Pages 3755-3762] described a generally applicable framework for building diagnostic classifiers from high throughput data by means of double loop cross validation (DLCV). A DLCV exercise enables the developer to estimate/predict the performance (in terms of generalized error) of the classifier for future applicability on data independent from the training data set. This methodology was adopted combined with forward filtering as feature selector, the t-statistic as criterion to evaluate the individual genes, and different classifiers. The training and validation procedure was performed employing 100 repeats of 3 folds cross validation in the outer (validation) loop, and 10 fold cross validation in the inner loop. In the inner loop, the algorithm learns the optimal parameter lambda for LASSO regularization. At all points data splits were stratified with respect to the class prior probabilities.

The double loop cross validation method can be described in a few steps:
1. For each repeat, the data is split (stratified) into 3 parts (different splits for each repeat).
2. For each fold, 2 parts are used for the inner loop (training set); the 3th is used in the outer loop for validation (validation set).

3. On the training set data, a 10-fold cross validation is performed to estimate the optimal lambda used in the LASSO penalty term (construction of a learning curve).
4. Next, a classifier is trained on the complete training set, using the top optimal lambda.
5. Finally, the performance of that classifier is assessed on the validation set.
6. After all repeats are completed, a final classifier is created using all samples with the average optimal lambda. The average number of n that were obtained are used to train the classifier. This classifier will then be applied on an external validation set.

Typically, datasets are unbalanced with respect to the class priors. Therefore, the balanced accuracy is a better classification performance than the accuracy since it takes the class priors into account. In each iteration, in the inner loop, the Brier score was used as performance criterion.

Classifier Based on Gene Expression (GE)

Parameters of the logistic classifier model based on gene expression were as follows:

| (Intercept) | 0.78199268 |
|---|---|
| ITGB3 | −0.19497568 |
| PLAT | −0.12305874 |
| SPP1 | −0.00831690 |
| GDF15 | −0.04554275 |
| IL8 | −0.03306434 |

Table 1 depicts the performance of the of the final classifier trained on the entire 770 patient cohort classifier for four different operating points: 1) max bACC: max balanced accuracy, 2) SEeqSP, sensitivity equal to specificity, 3) NPV97, NPV set to 0.97 in training, 4) LRNn025, log likelihood ratio for the negative test result set to 0.25 in training. If the coefficient is positive, then higher value implies increased risk. If the coefficient is negative, then the reduced value implies decreased risk. Variables with larger (absolute) coefficients have a larger contribution.

Table 2 depicts the performance of the classifiers trained in DLCV, averaged over 100 repeats, for four different operating points: 1) max bACC: max balanced accuracy, 2) SEeqSP, sensitivity equal to specificity, 3) NPV97, NPV set to 0.97 in training, 4) LRNn025, log likelihood ratio for the negative test result set to 0.25 in training.

Classifier Based on Clinical Variables (CL)

The parameters of the logistic classifier model based on clinical variables were as follows:

| (Intercept) | −1.86716485 |
|---|---|
| Age | −0.01919991 |
| Breslow depth | 0.72079160 |
| Ulceration-yes | 0.14301462 |

Table 3 The parameter "Age" is entered in years and the "Breslow depth" in millimeters. Ulceration is a Boolean variable (yes/no). The table depicts the performance of the of the final classifier trained on the entire 770 patient cohort classifier for four different operating points: 1) max bACC: max balanced accuracy, 2) SEeqSP, sensitivity equal to specificity, 3) NPV97, NPV set to 0.97 in training, 4) LRNn025, log likelihood ratio for the negative test result set to 0.25 in training. Table 4 depicts the performance of the classifiers trained in DLCV, averaged over 100 repeats, for four different operating points: 1) max bACC: max balanced accuracy, 2) SEeqSP, sensitivity equal to specificity, 3) NPV97, NPV set to 0.97 in training, 4) LRNn025, log likelihood ratio for the negative test result set to 0.25 in training.

Classifier based on Gene Expression and Clinical Variables (GECL)

The parameters of the logistic classifier model based on clinical variables and gene expression were as follows:

| (Intercept) | 0.59189841 |
|---|---|
| Age | −0.01356918 |
| Breslow depth | 0.4722686 |
| ITGB3 | −0.15443565 |
| PLAT | −0.13580062 |
| SPP1 | −0.00778917 |
| GDF15 | −0.05924340 |
| IL8 | −.003781148 |

Table 5 depicts the performance of the of the final classifier trained on the entire 770 patient cohort classifier for four different operating points: 1) max bACC: max balanced accuracy, 2) SEeqSP, sensitivity equal to specificity, 3) NPV97, NPV set to 0.97 in training, 4) LRNn025, log likelihood ratio for the negative test result set to 0.25 in training.

Table 6 depicts the performance of the classifiers trained in DLCV, averaged over 100 repeats, for four different operating points: 1) max bACC: max balanced accuracy, 2) SEeqSP, sensitivity equal to specificity, 3) NPV97, NPV set to 0.97 in training, 4) LRNn025, log likelihood ratio for the negative test result set to 0.25 in training.

FIG. 1 depicts the ROC curves for the logistic regression classifiers trained in DLCV on: 1) gene expression, 2) clinic-pathological variables, 3) gene expression and clinic-pathological variables combined.

Table 7 depicts the average performance of the classifiers trained in DLCV on: 1) gene expression ("GE"; i.e., ITGB3, PLAT, SPP1, GDF15 and IL8 gene signature, 2) clinic-pathological variables ("CL"; i.e., age and Breslow depth), 3) gene expression and clinic-pathological variables combined ("GECL"). Three different operating points have been considered: 1) max bACC: max balanced accuracy, 2) SEeqSP, sensitivity equal to specificity, 3) NPV97, NPV set to 0.97 in training.

Example 2 Comparative Example

Classifier Based on ITLP Score (ITGB3, LAMB1, PLAT and TP53)

Table 8 depicts the performance of the of the ITLP score on the entire 770 patient cohort.

Classifier Based on ITLP Score and Clinical Variables

The parameters of the logistic classifier model based on clinical variables and gene expression were as follows:

| (Intercept) | −2.07660948 |
|---|---|
| Age | −0.0111771 |
| Breslow depth | 0.52425831 |
| ITLP | 0.50016404 |

Table 9 depicts the performance of the of the final classifier trained on the entire 770 patient cohort classifier for four different operating points: 1) max bACC: max balanced accuracy, 2) SEeqSP, sensitivity equal to specificity, 3) NPV97, NPV set to 0.97 in training, 4) LRNn025, log likelihood ratio for the negative test result set to 0.25 in training.

Table 10 depicts the performance of the classifiers trained in DLCV, averaged over 100 repeats, for four different operating points: 1) max bACC: max balanced accuracy, 2) SEeqSP, sensitivity equal to specificity, 3) NPV97, NPV set to 0.97 in training, 4) LRNn025, log likelihood ratio for the negative test result set to 0.25 in training.

Example 3: Comparative Analysis

ITLP Vs. ITGB3, PLAT, GDF15, SPP1 and IL8 Gene Signature

Figure 2:
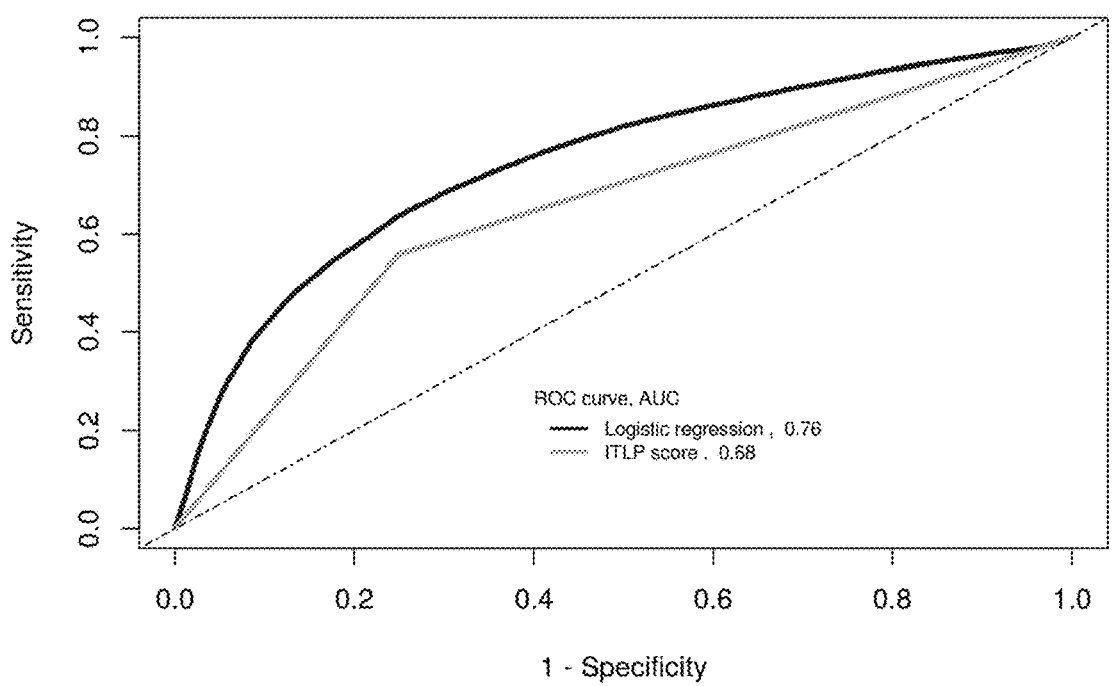
FIG. 2: ROC curves for the ITLP score and for the SLN gene signature (referred to as the "logistic regression model"), on the entire 770 patient cohort. The x-axis represents the false positive discovery rate (i.e., 1−specificity), the y-axis the true discovery rate (i.e., sensitivity).

FIG. 2 depicts the ROC curves for the ITLP score and for the ITGB3, PLAT, GDF15, SPP1 and IL8 gene signature ("referred to as logistic regression" in the figure). The ITGB3, PLAT, GDF15, SPP1 and IL8 gene signature clearly outperforms the ITLP signature.

Example 4: Performance of Gene Subsets

The previous examples used 5 genes: ITGB3, PLAT, GDF15, SPP1 and IL8 for the gene signature. All possible subsets of 2, 3 and 4 genes were investigated. The number of subsets of a specific dimension that can be selected from the total number of genes for the following signatures is as follows: 10 subsets from signatures with two genes, 10 subsets from signatures with three genes, 5 subsets from signatures with four genes and one signature comprising all 5. The performance was evaluated in terms of area under the ROC curve and compared to the ITLP signature. The AUC (or range thereof) was 0.68 for ITLP, 0.72-0.75 for all subsets of 2, 0.74-0.77 for all subsets of 3, 0.76-0.77 for all subsets of 4, and 0.77 for the 5 gene signature. This is also shown in FIG. 3. Accordingly, all gene signatures comprising at least two of the following genes: ITGB3, PLAT, GDF15, SPP1 and IL8 outperform the ITLP signature.

Example 5: Performance for the 43 Samples with Low Volume of Metastatic Disease

Patients with low volume of metastatic disease (volume 1 & 2) have been excluded, in first instance, from the cohort used for training the classifier. It remains controversial whether samples having cell clusters less than 0.1 mm in diameter should be considered metastatic positive and from a clinical viewpoint are generally considered negative. In the present study, 43 patients were initially excluded from the analysis since they have a volume 1 or 2. Applying the ITGB3, PLAT, GDF15, SPP1 and IL8 classifier on such patients, resulted in the classification of 29 as positive and 14 as negative.

Example 6: Misclassification Analysis

False negative. The misclassified positive samples are mostly from patients with thin melanomas (less than 2 mm), without ulceration, and with no angio-lymphatic invasion. In other words, these are patients that present a very low a priori risk of developing metastasis. There are a few sample misclassified in all the 100 repetitions of the algorithm.

False positive. The misclassified negative samples are mostly from patients with thick melanomas (more than 2 mm), with ulceration, and with angio-lymphatic invasion. In other words, these are patients that present a high a priori risk of developing metastasis. There are a few sample misclassified in all the 100 repetitions of the algorithm.

Classifier Output Distribution

The distribution of the predicted probability is uni-modal not Gaussian with a long right tale. The threshold used to choose the operating point falls nearby the mean of the distribution. The estimated probabilities do not exceed 0.6.

Example 7: Prognostic Association of the SLN Gene Signature

Kaplan-Meier survival estimates for three types of survival were generated for the SLN classifier comprising the genes ITGB3, PLAT, SPP1, GDF15 and IL8 (referred to in the example as "GECL") (Tables 19-21 (a)), SLNB status (Tables 19-21 (a)), and the combination of those two (Table 22-24 (a)). As known in the literature, a positive SLNB status is associated with inferior survival. Strikingly, the GECL model provided a much stronger separation in survival estimates, which is also evident from the larger Hazard Ratios (Table 25 (a)). In addition, in a multivariate analysis, the GECL classifier also has a much larger hazard ration and more significant p-value (see Table 26 (a)). Of particular note is the very good Melanoma Specific Survival of the GECL negative group, with survival estimates of 0.966 at 160 months (Table 19 (a)).

Similarly, Kaplan-Meier survival estimates for three types of survival were generated for the SLN classifier comprising the genes GDF15, MLANA, PLAT, IL8, ITGB3, LOXL4, ADIPOQ, PRKCB, SERPINE2, ADAM12, LGALS1, and TGFBR1 (referred to in the example as "GECL") (Tables 19-21), SLNB status (Tables 19-21), and the combination of those two (Table 22-24). Tables 19-26(b) describes the results with an NPV set to 0.97 in training, whereas Tables 19-26(c) describes the results with an NPV set to 0.98 in training. See example 8 for further discussion on this classifier.

Combining the results from the GECL classifier output with the SLNB status provided four groups, True Positives (TP), False Positives (FP), False Negatives (FN), and True Negatives (TN). As indicated earlier, there are very few FN cases, and a substantial percentage of FP cases. Strikingly, the False Positive group (positive by GECL, negative SLNB status), has survival estimates very similar to the True Negative group. This indicates that the GECL classifier output is superior over the SLNB status as a means to provide a prognosis to Melanoma patients.

Kaplan-Meier method is used in order to estimate survival probability at several time intervals. The log-rank test is a nonparametric test used in comparing survival curves between two or more groups.

The hazard ratio (HR) has been defined as the ratio of (risk of outcome in one group)/(risk of outcome in another group), occurring at a given interval of time. Hazard ratio of 1 means lack of association, a hazard ratio greater than 1 suggests an increased risk, and hazard ratio below 1 suggests a smaller risk. Hazard ratio is used to represent the relative difference between only two groups.

Example 8: Refinement of SLN Classifier

Four gene panels have been measured on the entire 855 cohort for a total of 109 unique genes. However, gene expression could not be measured for some of the samples because the samples could not be retrieved at the time of the analysis or there was not enough RNA. Therefore, the discovery has been done on a cohort of 754 patients instead of 770. The discovery cohort does not include patients with low volume of metastatic disease.

For each classifier, it is reported

Performance of the final classifier trained o the entire cohort

Average performance in cross validation (100 repeats of double loop cross validation with 3 folds for the external loop and 10 fold for the internal loop). The performance in the 3 folds are concatenated to cover the whole cohort.

For each classifier the performance are calculated at 4 different operating points:

MaxbACC: Maximum balanced accuracy
SEeqSP: Sensitivity equal to specificity
NPV97: Negative predictive value equal to 97% in training
NPV98: Negative predictive value equal to 98% in training Clinical-Pathological Model (CL)

The parameters of the logistic classifier model based on clinical-pathological variables are as follows.

| features | parameters |
| --- | --- |
| (Intercept) | −2.0547083 |
| age | −0.0112913 |
| breslow_depth | 0.6116335 |
| angiolymphatic_invasionyes | 0.1205238 |

Table 27 depicts the performance of the final classifier trained on the entire 754 patient cohort for four different operating points: 1) max bACC: max balanced accuracy, 2) SEeqSP, sensitivity equal to specificity, 3) NPV97, NPV set to 0.97 in training, 4) NPV98, NPV set to 0.98 in training. If the coefficient is positive, then higher value implies increased risk. If the coefficient is negative, then the reduced value implies decreased risk. Variables with larger (absolute) coefficients have a larger contribution.

Table 28 depicts the performance of the classifiers trained in DLCV, averaged over 100 repeats, for four different operating points: 1) max bACC: max balanced accuracy, 2) SEeqSP, sensitivity equal to specificity, 3) NPV97, NPV set to 0.97 in training, 4) NPV98, NPV set to 0.98 in training.
Gene Expression Model (GE)

| Parameters of the logistic classifier model based on gene expression are as follows. | |
| --- | --- |
| features | parameters |
| (Intercept) | 0.2163637 |
| GDF15 | −0.0043387 |
| MLANA | −0.0075059 |
| PLAT | −0.1181693 |
| IL8 | −0.0413252 |
| ITGB3 | −0.0725009 |
| LOXL4 | −0.0211895 |
| ADIPOQ | 0.0011397 |
| PRKCB | 0.0070037 |
| SERPINE2 | −0.2954317 |
| ADAM12 | −0.0088591 |
| LGALS1 | −0.0291427 |
| TGFBR1 | −0.0003869 |

Table 29 depicts the performance of the final classifier trained on the entire 754 patient cohort for four different operating points: 1) max bACC: max balanced accuracy, 2) SEeqSP, sensitivity equal to specificity, 3) NPV97, NPV set to 0.97 in training, 4) NPV98, NPV set to 0.98 in training. If the coefficient is positive, then higher value implies increased risk. If the coefficient is negative, then the reduced value implies decreased risk. Variables with larger (absolute) coefficients have a larger contribution.

Table 30 depicts the performance of the classifiers trained in DLCV, averaged over 100 repeats, for four different operating points: 1) max bACC: max balanced accuracy, 2) SEeqSP, sensitivity equal to specificity, 3) NPV97, NPV set to 0.97 in training, 4) NPV98, NPV set to 0.98 in training.
Combined Model with Clinical-Pathological and Gene Expression (GECL)

| Parameters of the logistic classifier model based on gene expression and clinic-pathological variables are as follows. | | | |
| --- | --- | --- | --- |
| features | parameters | features | parameters |
| (Intercept) | −0.1712118 | IL8 | −0.0299491 |
| age | −0.0119619 | ITGB3 | −0.0650425 |
| breslow_depth | 0.4152354 | LOXL4 | −0.0090683 |
| GDF15 | −0.0034702 | ADIPOQ | 0.0042436 |
| MLANA | −0.0203507 | SERPINE2 | −0.2287815 |
| PLAT | −0.1176641 | TGFBR1 | −0.0095219 |

Table 31 depicts the performance of the final classifier trained on the entire 754 patient cohort for four different operating points: 1) max bACC: max balanced accuracy, 2) SEeqSP, sensitivity equal to specificity, 3) NPV97, NPV set to 0.97 in training, 4) NPV98, NPV set to 0.98 in training. If the coefficient is positive, then higher value implies increased risk. If the coefficient is negative, then the reduced value implies decreased risk. Variables with larger (absolute) coefficients have a larger contribution.

Table 32 depicts the performance of the classifiers trained in DLCV, averaged over 100 repeats, for four different operating points: 1) max bACC: max balanced accuracy, 2) SEeqSP, sensitivity equal to specificity, 3) NPV97, NPV set to 0.97 in training, 4) NPV98, NPV set to 0.98 in training.

Figure 6:
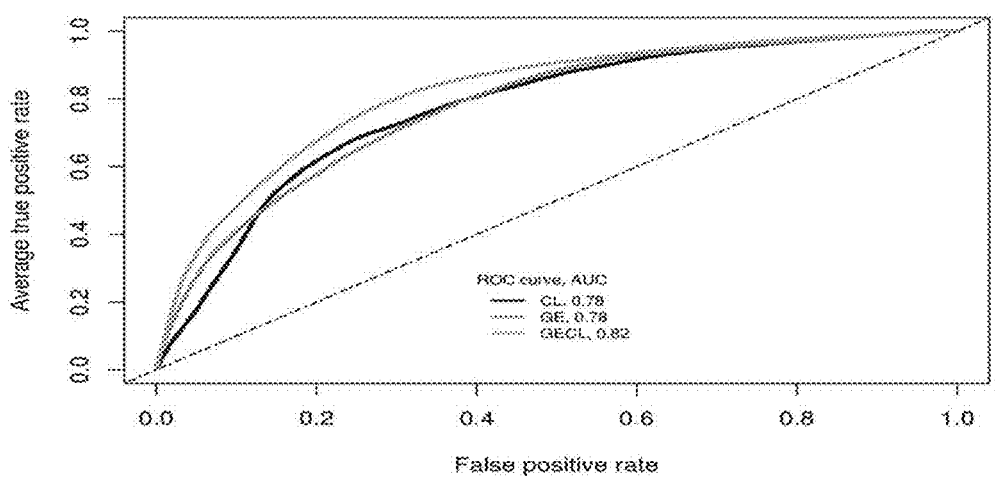
FIG. 6: OVERALL PERFORMANCE COMPARISON: CL VS GE VS GECL. ROC curves for the logistic regression classifiers trained in DLCV on: 1) gene expression, 2) clinic-pathological variables, 3) gene expression and clinic-pathological variables combined.
Figure 7:
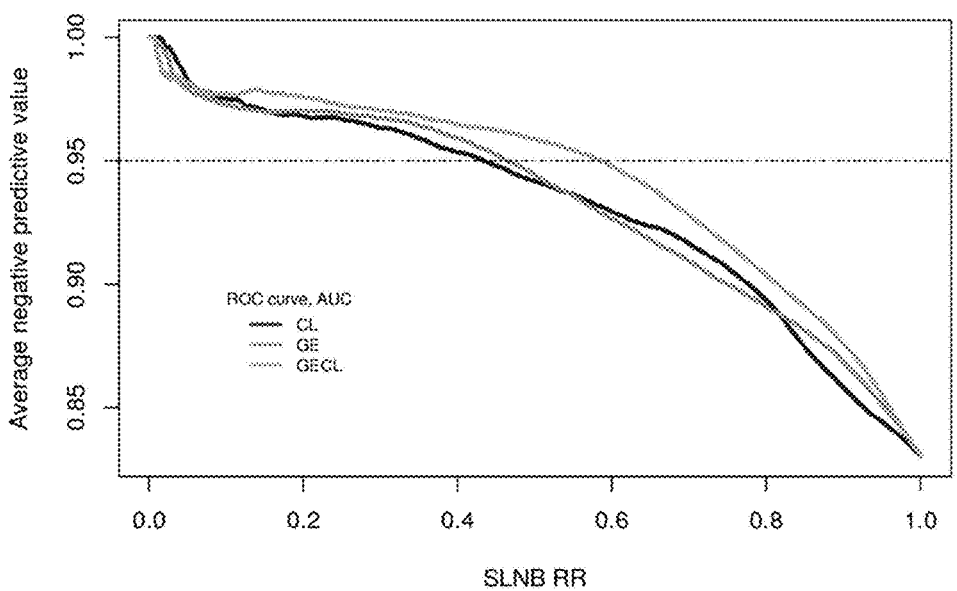
FIG. 7: NPV vs SLNBRR. Negative Predictive Value (NPV) versus the Sentinel Lymph Node reduction Rate (SLNB RR) for the logistic regression classifiers trained in DLCV on: 1) gene expression, 2) clinic-pathological variables, 3) gene expression and clinic-pathological variables combined.

FIG. 6 depicts the ROC curves for the logistic regression classifiers trained in DLCV on: 1) gene expression, 2) clinic-pathological variables, 3) gene expression and clinic-pathological variables combined and FIG. 7 depicts the Negative Predictive Value (NPV) versus the Sentinel Lymph Node reduction Rate (SLNB RR) for the logistic regression classifiers trained in DLCV on: 1) gene expression, 2) clinic-pathological variables, 3) gene expression and clinic-pathological variables combined.

Comparisons at Different Operating Points (OP): CL Vs CE Vs GECL

Table 33 depicts the average performance of the classifiers trained in DLCV on: 1) gene expression ("GE"; i.e., GDF15, MLANA, PLAT, IL8, ITGB3, LOXL4, ADIPOQ, PRKCB, SERPINE2, ADAM12, LGALS1 and TGFBR1 gene signature, 2) clinic-pathological variables ("CL"; i.e., age, Breslow depth and presence of angiolymphatic_invasion), 3) gene expression and clinic-pathological variables combined ("GECL": i.e., age, Breslow depth, GDF15, MLANA, PLAT, IL8, ITGB3, LOXL4, ADIPOQ, SERPINE2 and TGFBR1). For operating point max balanced accuracy (max bACC).

Table 34 depicts the average performance of the classifiers trained in DLCV on: 1) gene expression ("GE"; i.e., GDF15, MLANA, PLAT, IL8, ITGB3, LOXL4, ADIPOQ, PRKCB, SERPINE2, ADAM12, LGALS1 and TGFBR1 gene signature, 2) clinic-pathological variables ("CL"; i.e., age, Breslow depth and presence of angiolymphatic_invasion), 3) gene expression and clinic-pathological variables combined ("GECL": i.e., age, Breslow depth, GDF15, MLANA, PLAT, IL8, ITGB3, LOXL4, ADIPOQ, SER- PINE2 and TGFBR1). For operating point with sensitivity equal to specificity (SEeqSP).

Table 35 depicts the average performance of the classifiers trained in DLCV on: 1) gene expression ("GE"; i.e., GDF15, MLANA, PLAT, IL8, ITGB3, LOXL4, ADIPOQ, PRKCB, SERPINE2, ADAM12, LGALS1 and TGFBR1 gene signature, 2) clinic-pathological variables ("CL"; i.e., age, Breslow depth and presence of angiolymphatic_invasion), 3) gene expression and clinic-pathological variables combined ("GECL": i.e., age, Breslow depth, GDF15, MLANA, PLAT, IL8, ITGB3, LOXL4, ADIPOQ, SERPINE2 and TGFBR1). For an operating points with NPV set to 0.97 in training (NPV97).

Table 36 depicts the average performance of the classifiers trained in DLCV on: 1) gene expression ("GE"; i.e., GDF15, MLANA, PLAT, IL8, ITGB3, LOXL4, ADIPOQ, PRKCB, SERPINE2, ADAM12, LGALS1 and TGFBR1 gene signature, 2) clinic-pathological variables ("CL"; i.e., age, Breslow depth and presence of angiolymphatic_invasion), 3) gene expression and clinic-pathological variables combined ("GECL": i.e., age, Breslow depth, GDF15, MLANA, PLAT, IL8, ITGB3, LOXL4, ADIPOQ, SERPINE2 and TGFBR1). For an operating points with NPV set to 0.98 in training (NPV98).

Performance Stratified by T Staging

Table 37 depicts the average performance stratified by T stage of the classifiers trained in DLCV on clinic-pathological variables ("CL"; i.e., age, Breslow depth and presence of angiolymphatic_invasion). For an operating point with NPV set to 0.97 in training (NPV97).

Table 38 depicts the average performance stratified by T stage of the classifiers trained in DLCV on gene expression ("GE"; i.e., GDF15, MLANA, PLAT, IL8, ITGB3, LOXL4, ADIPOQ, PRKCB, SERPINE2, ADAM12, LGALS1 and TGFBR1. For an operating point with NPV set to 0.97 in training (NPV97).

Table 39 depicts the average performance stratified by T stage of the classifiers trained in DLCV on gene expression and clinic-pathological variables combined ("GECL": i.e., age, Breslow depth, GDF15, MLANA, PLAT, IL8, ITGB3, LOXL4, ADIPOQ, SERPINE2 and TGFBR1). For an operating points with NPV set to 0.97 in training (NPV97).

Table 40 depicts the average performance stratified by T stage of the classifiers trained in DLCV on clinic-pathological variables ("CL"; i.e., age, Breslow depth and presence of angiolymphatic_invasion). For an operating point with NPV set to 0.98 in training (NPV98).

Table 41 depicts the average performance stratified by T stage of the classifiers trained in DLCV on gene expression ("GE"; i.e., GDF15, MLANA, PLAT, IL8, ITGB3, LOXL4, ADIPOQ, PRKCB, SERPINE2, ADAM12, LGALS1 and TGFBR1. For an operating point with NPV set to 0.98 in training (NPV98).

Table 42 depicts the average performance stratified by T stage of the classifiers trained in DLCV on gene expression and clinic-pathological variables combined ("GECL": i.e., age, Breslow depth, GDF15, MLANA, PLAT, IL8, ITGB3, LOXL4, ADIPOQ, SERPINE2 and TGFBR1). For an operating points with NPV set to 0.98 in training (NPV98).

Performance Stratified by Clinical Staging

Table 43 depicts the average performance stratified by clinical stage of the classifiers trained in DLCV on clinic-pathological variables ("CL"; i.e., age, Breslow depth and presence of angiolymphatic_invasion). For an operating point with NPV set to 0.97 in training (NPV97).

Table 44 depicts the average performance stratified by clinical stage of the classifiers trained in DLCV on gene expression ("GE"; i.e., GDF15, MLANA, PLAT, IL8, ITGB3, LOXL4, ADIPOQ, PRKCB, SERPINE2, ADAM12, LGALS1 and TGFBR1. For an operating point with NPV set to 0.97 in training (NPV97).

Table 45 depicts the average performance stratified by clinical stage of the classifiers trained in DLCV on gene expression and clinic-pathological variables combined ("GECL": i.e., age, Breslow depth, GDF15, MLANA, PLAT, IL8, ITGB3, LOXL4, ADIPOQ, SERPINE2 and TGFBR1). For an operating points with NPV set to 0.97 in training (NPV97).

Table 46 depicts the average performance stratified by clinical stage of the classifiers trained in DLCV on clinic-pathological variables ("CL"; i.e., age, Breslow depth and presence of angiolymphatic_invasion). For an operating point with NPV set to 0.98 in training (NPV98).

Table 47 depicts the average performance stratified by clinical stage of the classifiers trained in DLCV on gene expression ("GE"; i.e., GDF15, MLANA, PLAT, IL8, ITGB3, LOXL4, ADIPOQ, PRKCB, SERPINE2, ADAM12, LGALS1 and TGFBR1. For an operating point with NPV set to 0.98 in training (NPV98).

Table 48 depicts the average performance stratified by clinical stage of the classifiers trained in DLCV on gene expression and clinic-pathological variables combined ("GECL": i.e., age, Breslow depth, GDF15, MLANA, PLAT, IL8, ITGB3, LOXL4, ADIPOQ, SERPINE2 and TGFBR1). For an operating points with NPV set to 0.98 in training (NPV98).

Gene Subsets

Figure 8:
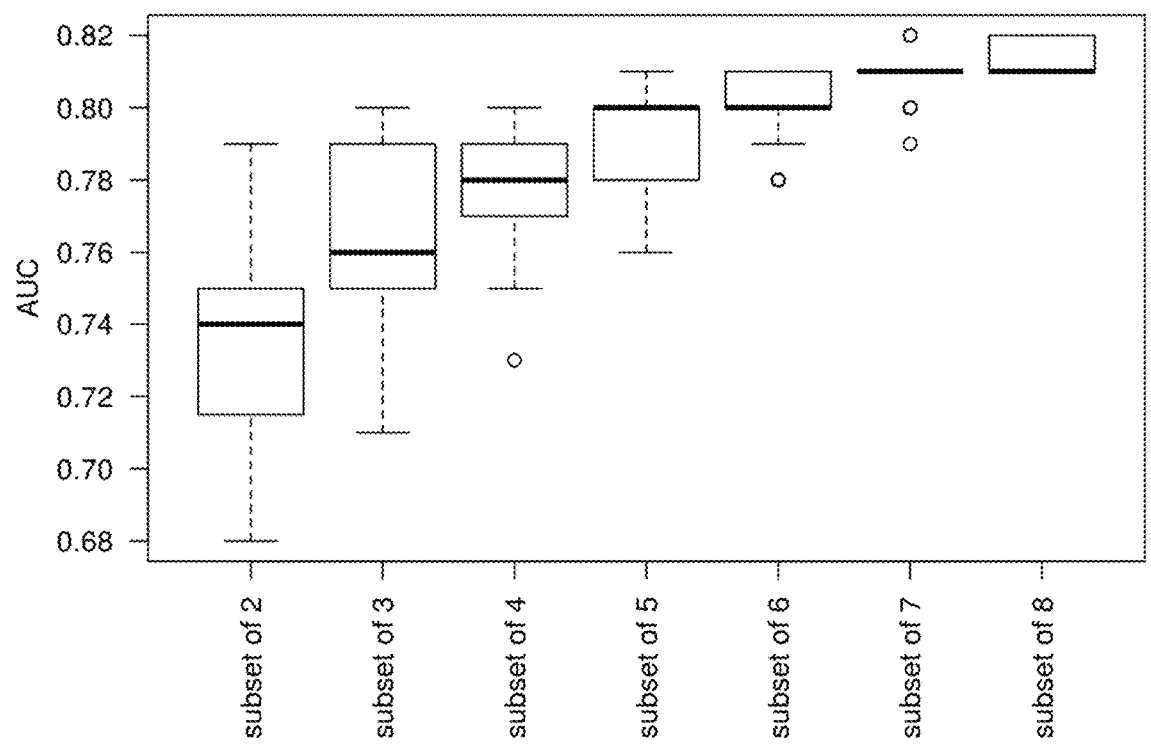
FIG. 8: GENE SUBSETS-AUC BOXPLOTS. Boxplots of the Area Under the Curve (AUC) of the ROC curve for logistic regression classifiers with subsets of 2, 3, 4, 5, 6, 7, 8 genes trained on the entire cohort.

FIG. 8 depicts the boxplots of the Area Under the Curve (AUC) of the ROC curve for logistic regression classifiers with subsets of 2, 3, 4, 5, 6, 7, 8 genes selected from GDF15, MLANA, PLAT, IL8, ITGB3, LOXL4, ADIPOQ, SERPINE2, and TGFBR1 and trained on the entire cohort.

Table 49 depicts the Number of subsets of a specific dimension that can be selected from the total number of genes in each the signature, and the performance in terms of minimum and maximum area under the ROC curve.

Example 9: Non-Sentinel Lymph-Node (N-SLN) Profiler

Completion lymph node dissection (CLND), with the removal of Non-Sentinel Lymph Node (N-SLN), has been standard for clinically node-negative melanoma patients with positive sentinel lymph nodes (SLN). SLN biopsy followed by immediate CLND improves regional disease control, and randomized clinical trials have shown that early surgery for lower volume SLN-positive disease results in fewer long-term sequelae (e.g., lymphedema) than surgery at nodal relapse. Moreover, SLN and N-SLN metastasis is an adverse prognostic factor used to select patients for adjuvant therapy. However, for patients enrolled in MSLT-II no survival benefit was imparted by CLND, which has a higher complication rate than SLN surgery alone. New methods are needed to identify patients likely to benefit from CLND, i.e., those at risk of regional metastasis in N-SLN, to improve patient selection for CLND. Here, three classifiers were designed based on gene expression (KRT14, SPP1, FN1 and LOXL3), clinicopathologic variables (age, number of positive SLN, largest dimension of the SLN, max Breslow depth and max mitotic rate) and on both, to predict the status of N-SLN, namely presence of absence of metastasis. These classifiers can be used to select which patients should undergo the CLND procedure.

The methods used were largely the same as indicated in Example 1. The same 29 genes were evaluated. Parameters of the logistic regression classifier model based on gene expression are as follows:

| | |
|---|---|
| Intercept | −0.94837538 |
| KRT14_3 | 0.06687021 |
| SPP1_3 | −0.02696531 |
| FN1_3 | −0.20982959 |
| LOXL_3.3 | −0.01722991 |

Performance of the Model

The number of patients in the entire cohort was 140.

Table 11 depicts the performance of the classifiers trained in DLCV, averaged over 100 repeats, for four different operating points: 1) max bACC: max balanced accuracy, 2) SEeqSP, sensitivity equal to specificity, 3) NPV97, NPV set to 0.97 in training, 4) LRNn025, log likelihood ratio for the negative test result set to 0.25 in training.

Table 12 depicts the performance of the classifiers trained in DLCV, averaged over 100 repeats, for four different operating points: 1) max bACC: max balanced accuracy, 2) SEeqSP, sensitivity equal to specificity, 3) NPV97, NPV set to 0.97 in training, 4) LRNn025, log likelihood ratio for the negative test result set to 0.25 in training.

Classifier Based on Clinical Variables (CL)

The parameters of the logistic classifier model based on clinical variables were as follows:

| | |
|---|---|
| (Intercept) | −4.60115005 |
| Age | 0.03787092 |
| Max breslow depth | 0.04057410 |
| slnb_num_positive.cat2+ | 1.14121008 |
| Lymph_node_largest_dim.cat2.5+ | 0.90937183 |
| Max_mitotic.cat > 6 | 0.35332099 |

Table 13 depicts the performance of the final classifier trained on the entire 140 patients cohort classifier for four different operating points: 1) max bACC: max balanced accuracy, 2) SEeqSP, sensitivity equal to specificity, 3) NPV97, NPV set to 0.97 in training, 4) LRNn025, log likelihood ratio for the negative test result set to 0.25 in training.

Table 14 depicts the performance of the classifiers trained in DLCV, averaged over 100 repeats, for four different operating points: 1) max bACC: max balanced accuracy, 2) SEeqSP, sensitivity equal to specificity, 3) NPV97, NPV set to 0.97 in training, 4) LRNn025, log likelihood ratio for the negative test result set to 0.25 in training.

Classifier Based on Gene Expression and Clinical Variables (GECL)

Logistic Regression Parameters

| | |
|---|---|
| Intercept | −2.34454707 |
| Age | 0.02009938 |
| slnb_num_positive.cat2+ | 0.70415832 |
| Lymph_node_largest_dim .cat2.5+ | 0.67873684 |
| KRT14_3 | 0.06115660 |
| SPP1_3 | −0.01572158 |
| FN1_3 | −0.22148054 |
| LOXL3_3 | −0.04907296 |

Parameters of the logistic classifier model based on gene expression.

Table 15 depicts performance of the of the final classifier trained on the entire 140 patients cohort classifier for four different operating points: 1) max bACC: max balanced accuracy, 2) SEeqSP, sensitivity equal to specificity, 3) NPV97, NPV set to 0.97 in training, 4) LRNn025, log likelihood ratio for the negative test result set to 0.25 in training.

Table 16 depicts performance of the classifiers trained in DLCV, averaged over 100 repeats, for four different operating points: 1) max bACC: max balanced accuracy, 2) SEeqSP, sensitivity equal to specificity, 3) NPV97, NPV set to 0.97 in training, 4) LRNn025, log likelihood ratio for the negative test result set to 0.25 in training.

Figure 4:
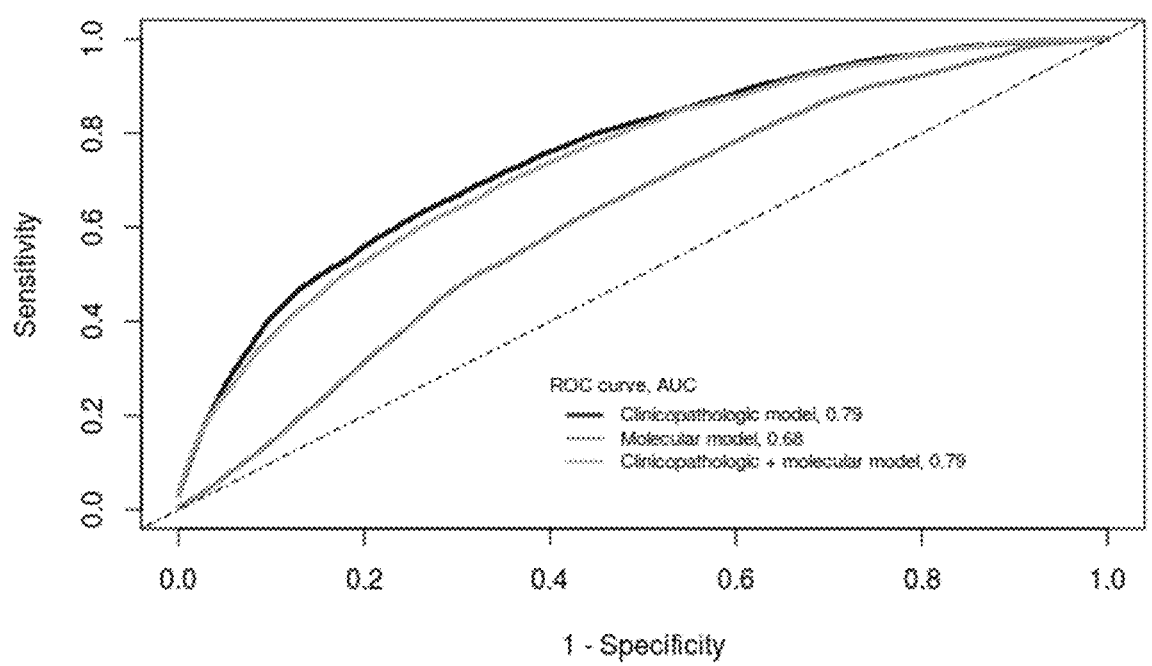
FIG. 4: Average ROC curves for the logistic regression classifiers trained in DLCV on: 1) gene expression, 2) clinic-pathological variables, 3) gene expression and clinic-pathological variables combined. The x-axis represents the false positive discovery rate (i.e., 1-specificity), the y-axis the true discovery rate (i.e., sensitivity).

FIG. 4 depicts average ROC curves for the logistic regression classifiers trained in DLCV on: 1) gene expression, 2) clinic-pathological variables, 3) gene expression and clinic-pathological variables combined. The x-axis represents the false positive discovery rate (i.e., 1-specificity), the y-axis the true discovery rate (i.e., sensitivity).

Figure 5:
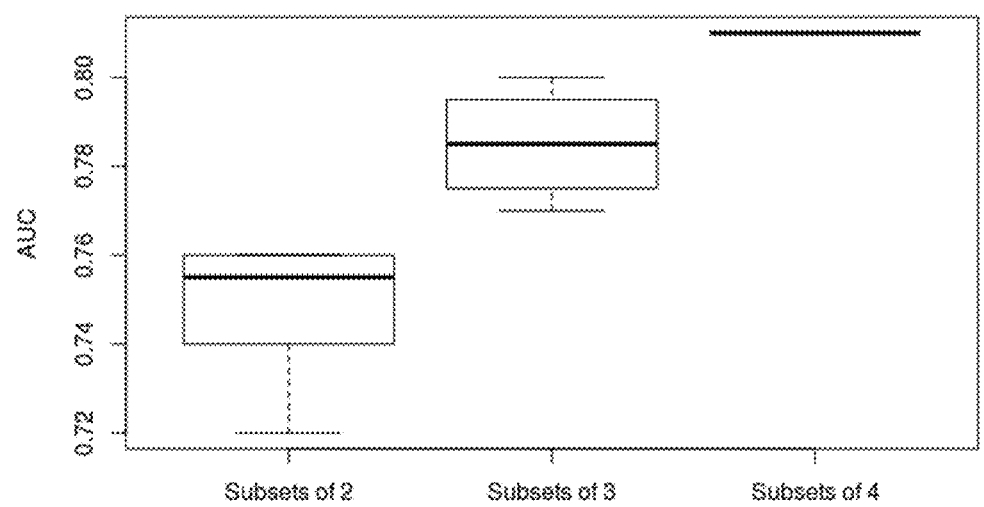
FIG. 5: Boxplots of the area under the ROC curves for the different gene subsets and for the full set of 4 genes.

FIG. 5: Boxplots of the area under the ROC curves for the different gene subsets and for the full set of 4 genes.

Table 17 depicts average performance of the classifiers trained in DLCV on: 1) gene expression, 2) clinic-pathological variables, 3) gene expression and clinic-pathological variables combined. Three different operating points have been considered: 1) max bACC: max balanced accuracy, 2) SEeqSP, sensitivity equal to specificity, 3) NPV97, NPV set to 0.97 in training.

The N-SLNprofiler profiler signature comprises 4 genes: KRT14, SPP1, FN1 and LOXL3. All possible subsets of 2, 3 and 4 genes have been looked at.

| Marker | Subsets of 2 | Subsets of 3 | Genes in Signature |
|---|---|---|---|
| NSLNB | 6 | 4 | 4 |

Number of subsets of a specific dimension that can be selected from the total number of genes in each the signature.

The performance has been evaluated in terms of area under the ROC curve (see table and figure)

| Performance Measure | Subset of 2 | Subset of 3 | Genes in signature |
|---|---|---|---|
| AUC range | 0.72-0.76 | 0.77-0.80 | 0.81 |

Area Under the Curve (AUC) range for the different gene subsets, for the full set of 4 genes.

FIG. 5 depicts boxplots of the area under the ROC curves for the different gene subsets and for the full set of 4 genes.

The discovery, design and development of the N-SLNprofiler are described. It is shown that the N-SLNprofiler can be used to select which patients should undergo the CLND procedure.

The performance of the classifier based on gene expression is of interest, since at the moment (i) there are no methods available to select the patients that would benefit from the CLND procedure, and (ii) the clinicopathologic variables used by the classifier might not be always available in the clinic.

Example 10

Pre-Selection Based on Breslow Depth (BD<=2 vs. BD>2)

Breslow Depth (BD) is an important clinicopathologic variable characterizing the primary cutaneous melanoma, and it is known that thin melanomas (BD<=2 mm) can have molecular and physiologically different characteristics compared to thick melanomas (BD>2 mm). Therefore, it would make sense to choose two different operating points for thin and thick melanomas. For thin melanomas with a Breslow depth <=2 mm (cohort of 561 samples), the classifier, as described in previous section (7.8) is used, with operating point chosen such that the NPV is 0.97 in training:

Table 18a depicts an average performance of the classifiers trained in DLCV on: 1) gene expression, 2) clinicpathological variables, 3) gene expression and clinicopathologic variables combined. The chosen operating point is NPV97, namely, NPV set to 0.97 in training.

For thick melanomas with BD>2 mm (cohort of 209 samples), the same classifier is used but with a different operating point, namely a point chosen to maximize the balanced accuracy:

Table 18b depicts an average performance of the classifiers trained in DLCV on: 1) gene expression, 2) clinicpathological variables, 3) gene expression and clinicopathologic variables combined. The chosen operating point has been selected such that it maximizes the balanced accuracy.

The performance for Breslow depth >2 though inferior to the performance for Breslow depth <=2 mm is still acceptable since the classifier achieves a NPV of 90% in a sub-population with a prior probability of SLNB positivity of 35%: upon taking the test and having a negative outcome, the probability of having a positive SLN drops from 35% to 10%.

Method for Determining Whether a Subject is Classified as Lymph Node Positive or Node Negative Fictitious data (see Table) is used as an example for the classification method, using 2 genes for simplicity, to predict whether a sample will be labeled as lymph node positive or lymph node negative by the classifier (the method/model is the same for both SLN profiler and for N-SLN profiler, just the parameters and the identities of the genes and clinical variables are different). The table describes the model parameters $\beta_0$, $\beta_1$, $\beta_2$ for a two genes (x,y) toy model, the fictitious gene expression data $\Delta C_t$, the estimated log odd-ratio log $$\frac{p}{1-p},$$

the estimated probability p, and the estimated output class labels based on a cutoff θ=0.19. The log odd-ratio and probability is calculated based on equation 1, and the probability is calculated using equation 2. The output label is assigned by comparing the estimated probability to the cutoff θ: if the estimated probability is greater than or equal to θ, then the sample is classified as node positive; if the estimated probability is smaller than θ then the sample is classified as node negative.

TABLE

Model parameters $\beta_0$, $\beta_1$, $\beta_2$, gene expression data $\Delta C_t$ for genes x,y, estimated log odd-ratio $\log \frac{p}{1-p}$, estimated probability p, and the estimated output class based on a cutoff θ = 0.19.

| Gene ID | Parameters $\beta_0 = 0.78$ | Gene expression ($\Delta C_t$) | $\log \frac{p}{1-p}$ | p | p ≥ θ |
|---|---|---|---|---|---|
| x | $\beta_1 = -0.19$ | 7.2 | −1.272 | 0.21 | Node+ |
| y | $\beta_2 = -0.12$ | 5.7 | | | |

$$\log \frac{p}{1-p} = \beta_0 + \beta_1 x + \beta_2 y \qquad (\text{eq. 1})$$

$$p = \frac{e^{\beta_0 + \beta_1 x + \beta_2 y}}{1 + e^{\beta_0 + \beta_1 x + \beta_2 y}} \qquad (\text{eq. 2})$$

Example 11

Equivalent to the analysis performed in Example 8, a preferred embodiment of this disclosure was found which employs 8 genes, and 2 clinicopathologic variables (Age and Breslow Depth), comprising the following set of genes: GDF15, MLANA, PLAT, IL8, ITGB3, LOXL4, SERPINE2, and TGFBR1. The parameters of the logistic regression model are as provided below:

| Features | Params |
|---|---|
| (Intercept) | −0.1736287 |
| age | −0.0118052 |
| breslow_depth | 0.4126846 |
| GDF15 | −0.0027222 |
| MLANA | −0.0185367 |
| PLAT | −0.1170421 |
| IL8 | −0.0299650 |
| ITGB3 | −0.0636119 |
| LOXL4 | −0.0054420 |
| SERPINE2 | −0.2342833 |
| TGFBR1 | −0.0067781 |

Different operating points were evaluated, revealing that multiple operating points provide clinically relevant classifiers, with high NPV, and substantial reduction of the number of SLNB procedures (SLNB.RR=SLNB Reduction Rate). The NPV975 operating point of 0.116 is specifically preferred, see Table below.

Table with performances of the GECL model with 8 genes and 2 clinicopathologic variables

| Input | P % | P | N | TP | FP | TN | FN | SE | SP | NPV | PPV | ACC | bACC | SLNB.RR | ER | AUC | cutoff | LRn | LRp |
|---|---|---|---|---|---|---|---|---|---|---|---|---|---|---|---|---|---|---|---|
| maxbACC | 0.17 | 128 | 626 | 102 | 155 | 471 | 26 | 0.797 | 0.752 | 0.948 | 0.397 | 0.76 | 0.775 | 0.659 | 0.0345 | 0.84 | 0.186 | 0.27 | 3.22 |
| SEeqSP | 0.17 | 128 | 626 | 99 | 140 | 486 | 29 | 0.773 | 0.776 | 0.944 | 0.414 | 0.776 | 0.775 | 0.683 | 0.0385 | 0.84 | 0.192 | 0.292 | 3.46 |
| NPV97 | 0.17 | 128 | 626 | 115 | 271 | 355 | 13 | 0.898 | 0.567 | 0.965 | 0.298 | 0.623 | 0.733 | 0.488 | 0.0172 | 0.84 | 0.133 | 0.179 | 2.08 |

-continued

| Input | P % | P | N | TP | FP | TN | FN | SE | SP | NPV | PPV | ACC | bACC | SLNB.RR | ER | AUC | cutoff | LRn | LRp |
|---|---|---|---|---|---|---|---|---|---|---|---|---|---|---|---|---|---|---|---|
| NPV975 | 0.17 | 128 | 626 | 119 | 319 | 307 | 9 | 0.93 | 0.49 | 0.972 | 0.272 | 0.565 | 0.71 | 0.419 | 0.0119 | 0.84 | 0.116 | 0.143 | 1.82 |
| NPV98 | 0.17 | 128 | 626 | 122 | 384 | 242 | 6 | 0.953 | 0.387 | 0.976 | 0.241 | 0.483 | 0.67 | 0.329 | 0.00796 | 0.84 | 0.0966 | 0.121 | 1.55 |

Comparing the performance of this GECL model with 8 genes and 2 clinicopathologic variables to those from Example 1 and 8, indicates that it outperforms (NPV and SLNB.RR) the expression only (GE), or clinicopathologic only (CL) models, and performs very similar to the GECL model from Example 1.

A Kaplan-Meier analysis was performed to assess the GECL model intersected with SLNB relative to RFS, DRFS, and MSS. The 5-year/60 month survival rates are reported in the Table below. Both the GECL and SLNB individually have a large separation between the Pos/Neg groups. More importantly, those patients identified as Pos by GECL that are SLNB Neg (and missed as such), have a very poor survival. This demonstrates the clinical relevance of the GECL model as a prognostic marker.

|  | MSS 5 year | DRFS 5 year | RFS 5 year |
|---|---|---|---|
| GECL = Neg & SLNB = Neg | 0.96 | 0.95 | 0.88 |
| GECL = Neg & SLNB = Pos | 0.83 | 0.50 | 0.34 |
| GECL = Pos & SLNB = Neg | 0.90 | 0.79 | 0.70 |
| GECL = Pos & SLNB = Pos | 0.84 | 0.72 | 0.50 |

Tables:

TABLE 1

| OP | P | N | TP | FP | TN | FN | SE | SP | NPV | PPV | ACC | bACC | AUC | cutoff | LRn | LRp |
|---|---|---|---|---|---|---|---|---|---|---|---|---|---|---|---|---|
| max bACC | 129 | 641 | 82 | 139 | 502 | 47 | 0.64 | 0.78 | 0.91 | 0.37 | 0.76 | 0.71 | 0.77 | 0.19 | 0.47 | 2.9 |
| SEeqSP | 129 | 641 | 92 | 178 | 463 | 37 | 0.71 | 0.72 | 0.93 | 0.34 | 0.72 | 0.72 | 0.77 | 0.18 | 0.4 | 2.6 |
| NPV97 | 129 | 641 | 126 | 620 | 21 | 3 | 0.98 | 0.033 | 0.88 | 0.17 | 0.19 | 0.5 | 0.77 | 0.081 | 0.71 | 1 |
| LRn025 | 129 | 641 | 126 | 624 | 17 | 3 | 0.98 | 0.027 | 0.85 | 0.17 | 0.19 | 0.5 | 0.77 | 0.08 | 0.88 | 1 |

TABLE 2

| OP | P | N | TP | FP | TN | FN | SE | SP | NPV | PPV | ACC | bACC | AUC | cutoff | LRn | LRp |
|---|---|---|---|---|---|---|---|---|---|---|---|---|---|---|---|---|
| max bACC | 129 | 641 | 80 | 153 | 488 | 49 | 0.62 | 0.76 | 0.91 | 0.34 | 0.74 | 0.69 | 0.75 | 0.19 | 0.5 | 2.6 |
| SEeqSP | 129 | 641 | 87 | 187 | 454 | 42 | 0.67 | 0.71 | 0.92 | 0.32 | 0.7 | 0.69 | 0.75 | 0.18 | 0.46 | 2.3 |
| NPV97 | 129 | 641 | 124 | 574 | 67 | 5 | 0.96 | 0.1 | 0.93 | 0.18 | 0.25 | 0.53 | 0.75 | 0.081 | 0.37 | 1.1 |
| LRn025 | 129 | 641 | 124 | 579 | 62 | 4 | 0.97 | 0.097 | 0.94 | 0.18 | 0.24 | 0.53 | 0.75 | 0.08 | 0.32 | 1.1 |

TABLE 3

| OP | P | N | TP | FP | TN | FN | SE | SP | NPV | PPV | ACC | bACC | AUC | cutoff | LRn | LRp |
|---|---|---|---|---|---|---|---|---|---|---|---|---|---|---|---|---|
| max bACC | 129 | 641 | 94 | 184 | 457 | 35 | 0.73 | 0.71 | 0.93 | 0.34 | 0.72 | 0.72 | 0.79 | 0.16 | 0.38 | 2.5 |
| SEeqSP | 129 | 641 | 92 | 176 | 465 | 37 | 0.71 | 0.73 | 0.93 | 0.34 | 0.72 | 0.72 | 0.79 | 0.17 | 0.4 | 2.6 |
| NPV97 | 129 | 641 | 115 | 331 | 310 | 14 | 0.89 | 0.48 | 0.96 | 0.26 | 0.55 | 0.69 | 0.79 | 0.12 | 0.22 | 1.7 |
| LRn025 | 129 | 641 | 115 | 334 | 307 | 14 | 0.89 | 0.48 | 0.96 | 0.26 | 0.55 | 0.69 | 0.79 | 0.12 | 0.23 | 1.7 |

TABLE 4

| OP | P | N | TP | FP | TN | FN | SE | SP | NPV | PPV | ACC | bACC | AUC | cutoff | LRn | LRp |
|---|---|---|---|---|---|---|---|---|---|---|---|---|---|---|---|---|
| max bACC | 129 | 641 | 92 | 192 | 449 | 37 | 0.71 | 0.7 | 0.92 | 0.32 | 0.7 | 0.71 | 0.77 | 0.16 | 0.41 | 2.4 |
| SEeqSP | 129 | 641 | 90 | 183 | 458 | 39 | 0.7 | 0.71 | 0.92 | 0.33 | 0.71 | 0.71 | 0.77 | 0.17 | 0.42 | 2.4 |
| NPV97 | 129 | 641 | 120 | 405 | 236 | 9 | 0.93 | 0.37 | 0.96 | 0.23 | 0.46 | 0.65 | 0.77 | 0.12 | 0.19 | 1.5 |
| LRn025 | 129 | 641 | 120 | 409 | 232 | 8 | 0.94 | 0.36 | 0.97 | 0.23 | 0.46 | 0.65 | 0.77 | 0.12 | 0.17 | 1.5 |

TABLE 5

| OP | P | N | TP | FP | TN | FN | SE | SP | NPV | PPV | ACC | bACC | AUC | cutoff | LRn | LRp |
|---|---|---|---|---|---|---|---|---|---|---|---|---|---|---|---|---|
| max bACC | 129 | 641 | 105 | 163 | 478 | 24 | 0.81 | 0.75 | 0.95 | 0.39 | 0.76 | 0.78 | 0.83 | 0.17 | 0.25 | 3.2 |
| SEeqSP | 129 | 641 | 95 | 149 | 492 | 34 | 0.74 | 0.77 | 0.94 | 0.39 | 0.76 | 0.75 | 0.83 | 0.18 | 0.34 | 3.2 |
| NPV97 | 129 | 641 | 119 | 335 | 306 | 10 | 0.92 | 0.48 | 0.97 | 0.26 | 0.55 | 0.7 | 0.83 | 0.11 | 0.16 | 1.8 |
| LRn025 | 129 | 641 | 119 | 341 | 300 | 10 | 0.92 | 0.47 | 0.97 | 0.26 | 0.54 | 0.7 | 0.83 | 0.11 | 0.17 | 1.7 |

TABLE 6

| OP | P | N | TP | FP | TN | FN | SE | SP | NPV | PPV | ACC | bACC | AUC | cutoff | LRn | LRp |
|---|---|---|---|---|---|---|---|---|---|---|---|---|---|---|---|---|
| max bACC | 129 | 641 | 97 | 177 | 464 | 32 | 0.75 | 0.72 | 0.94 | 0.35 | 0.73 | 00.74 | 0.8 | 0.17 | 0.34 | 2.7 |
| SEeqSP | 129 | 641 | 92 | 160 | 481 | 37 | 0.71 | 0.75 | 0.93 | 0.37 | 0.74 | 0.73 | 0.8 | 0.18 | 0.38 | 2.9 |
| NPV97 | 129 | 641 | 117 | 355 | 286 | 12 | 0.91 | 0.45 | 0.96 | 0.25 | 0.52 | 0.68 | 0.8 | 0.11 | 0.21 | 1.6 |
| LRn025 | 129 | 641 | 117 | 362 | 279 | 12 | 0.91 | 0.44 | 0.96 | 0.24 | 0.51 | 0.67 | 0.8 | 0.11 | 0.21 | 1.6 |

TABLE 7

| Input | P | N | TP | FP | TN | FN | SE | SP | NPV | PPV | ACC | bACC | AUC | cutoff | LRn | LRp |
|---|---|---|---|---|---|---|---|---|---|---|---|---|---|---|---|---|
| maxbACC | | | | | | | | | | | | | | | | |
| GE | 129 | 641 | 80 | 153 | 488 | 49 | 0.62 | 0.76 | 0.91 | 0.34 | 0.74 | 0.69 | 0.75 | 0.19 | 0.5 | 2.6 |
| CL | 129 | 641 | 92 | 192 | 449 | 37 | 0.71 | 0.7 | 0.92 | 0.32 | 0.7 | 0.71 | 0.77 | 0.16 | 0.41 | 2.4 |
| GECL | 129 | 641 | 97 | 177 | 464 | 32 | 0.75 | 0.72 | 0.94 | 0.35 | 0.73 | 0.74 | 0.8 | 0.17 | 0.34 | 2.7 |
| SEeqSP | | | | | | | | | | | | | | | | |
| GE | 129 | 641 | 87 | 187 | 454 | 42 | 0.67 | 0.71 | 0.92 | 0.32 | 0.7 | 0.69 | 0.75 | 0.18 | 0.46 | 2.3 |
| CL | 129 | 641 | 90 | 183 | 458 | 39 | 0.7 | 0.71 | 0.92 | 0.33 | 0.71 | 0.71 | 0.77 | 0.17 | 0.42 | 2.4 |
| GECL | 129 | 641 | 92 | 160 | 481 | 37 | 0.71 | 0.75 | 0.93 | 0.37 | 0.74 | 0.73 | 0.8 | 0.18 | 0.38 | 2.9 |
| NPV97 | | | | | | | | | | | | | | | | |
| GE | 129 | 641 | 124 | 574 | 67 | 5 | 0.96 | 0.1 | 0.93 | 0.18 | 0.25 | 0.53 | 0.75 | 0.081 | 0.37 | 1.1 |
| CL | 129 | 641 | 120 | 405 | 236 | 9 | 0.93 | 0.37 | 0.96 | 0.23 | 0.46 | 0.65 | 0.77 | 0.12 | 0.19 | 1.5 |
| GECL | 129 | 641 | 117 | 355 | 286 | 12 | 0.91 | 0.45 | 0.96 | 0.25 | 0.52 | 0.68 | 0.8 | 0.11 | 0.21 | 1.6 |

TABLE 8

| P | N | TP | FP | TN | FN | SE | SP | NPV | PPV | ACC | bACC | AUC | cutoff | LRn | LRp |
|---|---|---|---|---|---|---|---|---|---|---|---|---|---|---|---|
| 129 | 641 | 70 | 142 | 499 | 59 | 0.54 | 0.78 | 0.89 | 0.33 | 0.74 | 0.66 | NA | NA | 0.59 | 2.4 |

TABLE 9

| OP | P | N | TP | FP | TN | FN | SE | SP | NPV | PPV | ACC | bACC | AUC | cutoff | LRn | LRp |
|---|---|---|---|---|---|---|---|---|---|---|---|---|---|---|---|---|
| max bACC | 129 | 641 | 97 | 166 | 475 | 32 | 0.75 | 0.74 | 0.94 | 0.37 | 0.74 | 0.75 | 0.81 | 0.17 | 0.33 | 2.9 |
| SEeqSP | 129 | 641 | 94 | 159 | 482 | 35 | 0.73 | 0.75 | 0.93 | 0.37 | 0.75 | 0.74 | 0.81 | 0.17 | 0.36 | 2.9 |
| NPV97 | 129 | 641 | 119 | 361 | 280 | 10 | 0.92 | 0.44 | 0.97 | 0.25 | 0.52 | 0.68 | 0.81 | 0.12 | 0.18 | 1.6 |
| LRn025 | 129 | 641 | 119 | 362 | 279 | 10 | 0.92 | 0.44 | 0.97 | 0.25 | 0.52 | 0.68 | 0.81 | 0.12 | 0.18 | 1.6 |

TABLE 10

| OP | P | N | TP | FP | TN | FN | SE | SP | NPV | PPV | ACC | bACC | AUC | cutoff | LRn | LRp |
|---|---|---|---|---|---|---|---|---|---|---|---|---|---|---|---|---|
| max bACC | 129 | 641 | 94 | 176 | 465 | 35 | 0.73 | 0.73 | 0.93 | 0.35 | 0.73 | 0.73 | 0.79 | 0.17 | 0.37 | 2.7 |
| SEeqSP | 129 | 641 | 92 | 167 | 474 | 37 | 0.71 | 0.74 | 0.93 | 0.36 | 0.74 | 0.73 | 0.79 | 0.17 | 0.39 | 2.7 |
| NPV97 | 129 | 641 | 118 | 354 | 287 | 11 | 0.91 | 0.45 | 0.96 | 0.25 | 0.53 | 0.68 | 0.79 | 0.12 | 0.19 | 1.7 |
| LRn025 | 129 | 641 | 118 | 360 | 281 | 11 | 0.91 | 0.44 | 0.96 | 0.25 | 0.52 | 0.68 | 0.79 | 0.12 | 0.19 | 1.6 |

TABLE 11

| OP | P | N | TP | FP | TN | FN | SE | SP | NPV | PPV | ACC | bACC | AUC | cutoff | LRn | LRp |
|---|---|---|---|---|---|---|---|---|---|---|---|---|---|---|---|---|
| max bACC | 25 | 115 | 15 | 26 | 89 | 10 | 0.6 | 0.77 | 0.9 | 0.37 | 0.74 | 0.69 | 0.78 | 0.2 | 0.52 | 2.7 |
| SEeqSP | 25 | 115 | 15 | 25 | 90 | 10 | 0.6 | 0.78 | 0.9 | 0.38 | 0.75 | 0.69 | 0.78 | 0.21 | 0.51 | 2.8 |
| NPV97 | 25 | 115 | 19 | 44 | 71 | 6 | 0.76 | 0.62 | 0.92 | 0.3 | 0.64 | 0.69 | 0.78 | 0.18 | 0.39 | 2 |
| LRn025 | 25 | 115 | 19 | 44 | 71 | 6 | 0.76 | 0.62 | 0.92 | 0.3 | 0.64 | 0.69 | 0.78 | 0.18 | 0.39 | 2 |

TABLE 12

| OP | P | N | TP | FP | TN | FN | SE | SP | NPV | PPV | ACC | bACC | AUC | cutoff | LRn | LRp |
|---|---|---|---|---|---|---|---|---|---|---|---|---|---|---|---|---|
| max bACC | 25 | 115 | 11 | 34 | 81 | 14 | 0.44 | 0.7 | 0.85 | 0.24 | 0.66 | 0.57 | 0.68 | 0.2 | 0.8 | 1.5 |
| SEeqSP | 25 | 115 | 10 | 29 | 86 | 15 | 0.4 | 0.75 | 0.85 | 0.26 | 0.69 | 0.57 | 0.68 | 0.21 | 0.8 | 1.6 |
| NPV97 | 25 | 115 | 16 | 52 | 63 | 9 | 0.64 | 0.55 | 0.88 | 0.24 | 0.56 | 0.59 | 0.68 | 0.18 | 0.66 | 1.4 |
| LRn025 | 25 | 115 | 16 | 51 | 64 | 9 | 0.64 | 0.56 | 0.88 | 0.24 | 0.57 | 0.6 | 0.68 | 0.18 | 0.65 | 1.4 |

TABLE 13

| OP | P | N | TP | FP | TN | FN | SE | SP | NPV | PPV | ACC | bACC | AUC | cutoff | LRn | LRp |
|---|---|---|---|---|---|---|---|---|---|---|---|---|---|---|---|---|
| max bACC | 25 | 115 | 18 | 25 | 90 | 7 | 0.72 | 0.78 | 0.93 | 0.42 | 0.77 | 0.75 | 0.85 | 0.19 | 0.36 | 3.3 |
| SEeqSP | 25 | 115 | 18 | 24 | 91 | 7 | 0.72 | 0.79 | 0.93 | 0.43 | 0.78 | 0.76 | 0.85 | 0.2 | 0.35 | 3.4 |
| NPV97 | 25 | 115 | 22 | 46 | 69 | 3 | 0.88 | 0.6 | 0.96 | 0.32 | 0.65 | 0.74 | 0.85 | 0.13 | 0.2 | 2.2 |
| LRn025 | 25 | 115 | 22 | 45 | 70 | 3 | 0.88 | 0.61 | 0.96 | 0.33 | 0.66 | 0.74 | 0.85 | 0.14 | 0.2 | 2.2 |

TABLE 14

| OP | P | N | TP | FP | TN | FN | SE | SP | NPV | PPV | ACC | bACC | AUC | cutoff | LRn | LRP |
|---|---|---|---|---|---|---|---|---|---|---|---|---|---|---|---|---|
| max bACC | 25 | 115 | 16 | 31 | 84 | 9 | 0.64 | 0.73 | 0.9 | 0.34 | 0.71 | 0.69 | 0.79 | 0.19 | 0.49 | 2.4 |
| SEeqSP | 25 | 115 | 15 | 26 | 89 | 10 | 0.6 | 0.77 | 0.9 | 0.37 | 0.74 | 0.69 | 0.79 | 0.2 | 0.52 | 2.7 |
| NPV97 | 25 | 115 | 19 | 48 | 67 | 6 | 0.76 | 0.58 | 0.92 | 0.28 | 0.61 | 0.67 | 0.79 | 0.14 | 0.41 | 1.8 |
| LRn025 | 25 | 115 | 19 | 47 | 68 | 5 | 0.79 | 0.59 | 0.93 | 0.29 | 0.62 | 0.69 | 0.79 | 0.14 | 0.35 | 1.9 |

TABLE 15

| OP | P | N | TP | FP | TN | FN | SE | SP | NPV | PPV | ACC | bACC | AUC | cutoff | LRn | LRp |
|---|---|---|---|---|---|---|---|---|---|---|---|---|---|---|---|---|
| max bACC | 25 | 115 | 15 | 14 | 101 | 10 | 0.6 | 0.88 | 0.91 | 0.52 | 0.83 | 0.74 | 0.88 | 0.24 | 0.46 | 4.9 |
| SEeqSP | 25 | 115 | 18 | 20 | 95 | 7 | 0.72 | 0.83 | 0.93 | 0.47 | 0.81 | 0.77 | 0.88 | 0.22 | 0.34 | 4.1 |
| NPV97 | 25 | 115 | 20 | 22 | 93 | 5 | 0.8 | 0.81 | 0.95 | 0.48 | 0.81 | 0.8 | 0.88 | 0.21 | 0.25 | 4.2 |
| LRn025 | 25 | 115 | 19 | 21 | 94 | 6 | 0.76 | 0.82 | 0.94 | 0.47 | 0.81 | 0.79 | 0.88 | 0.21 | 0.29 | 4.2 |

TABLE 16

| OP | P | N | TP | FP | TN | FN | SE | SP | NPV | PPV | ACC | bACC | AUC | cutoff | LRn | LRp |
|---|---|---|---|---|---|---|---|---|---|---|---|---|---|---|---|---|
| max bACC | 25 | 115 | 13 | 23 | 92 | 12 | 0.52 | 0.8 | 0.88 | 0.36 | 0.75 | 0.66 | 0.79 | 0.24 | 0.6 | 2.6 |
| SEeqSP | 25 | 115 | 14 | 25 | 90 | 11 | 0.56 | 0.78 | 0.89 | 0.36 | 0.74 | 0.67 | 0.79 | 0.22 | 0.56 | 2.6 |
| NPV97 | 25 | 115 | 15 | 31 | 84 | 10 | 0.6 | 0.73 | 0.89 | 0.33 | 0.71 | 0.67 | 0.79 | 0.21 | 0.55 | 2.2 |
| LRn025 | 25 | 115 | 15 | 30 | 85 | 10 | 0.6 | 0.74 | 0.89 | 0.33 | 0.71 | 0.67 | 0.79 | 0.21 | 0.54 | 2.3 |

TABLE 17

| Input | P | N | TP | FP | TN | FN | SE | SP | NPV | PPV | ACC | bACC | AUC | cutoff | LRn | LRp |
|---|---|---|---|---|---|---|---|---|---|---|---|---|---|---|---|---|
| maxbACC | | | | | | | | | | | | | | | | |
| GE | 25 | 115 | 11 | 34 | 81 | 14 | 0.44 | 0.7 | 0.85 | 0.24 | 0.66 | 0.57 | 0.68 | 0.2 | 0.8 | 1.5 |
| CL | 25 | 115 | 16 | 31 | 84 | 9 | 0.64 | 0.73 | 0.9 | 0.34 | 0.71 | 0.69 | 0.79 | 0.19 | 0.49 | 2.4 |
| GECL | 25 | 115 | 13 | 23 | 92 | 12 | 0.52 | 0.8 | 0.88 | 0.36 | 0.75 | 0.66 | 0.79 | 0.24 | 0.6 | 2.6 |
| SEeqSP | | | | | | | | | | | | | | | | |
| GE | 25 | 115 | 10 | 29 | 86 | 15 | 0.4 | 0.75 | 0.85 | 0.26 | 0.69 | 0.57 | 0.68 | 0.21 | 0.8 | 1.6 |
| CL | 25 | 115 | 15 | 26 | 89 | 10 | 0.6 | 0.77 | 0.9 | 0.37 | 0.74 | 0.69 | 0.79 | 0.2 | 0.52 | 2.7 |
| GECL | 25 | 115 | 14 | 25 | 90 | 11 | 0.56 | 0.78 | 0.89 | 0.36 | 0.74 | 0.67 | 0.79 | 0.22 | 0.56 | 2.6 |
| NPV97 | | | | | | | | | | | | | | | | |
| GE | 25 | 115 | 16 | 52 | 63 | 9 | 0.64 | 0.55 | 0.88 | 0.24 | 0.56 | 0.59 | 0.68 | 0.18 | 0.66 | 1.4 |
| CL | 25 | 115 | 19 | 48 | 67 | 6 | 0.76 | 0.58 | 0.92 | 0.28 | 0.61 | 0.67 | 0.79 | 0.14 | 0.41 | 1.8 |
| GECL | 25 | 115 | 15 | 31 | 84 | 10 | 0.6 | 0.73 | 0.89 | 0.33 | 0.71 | 0.67 | 0.79 | 0.21 | 0.55 | 2.2 |

TABLE 18a

| Input | P | N | TP | FP | TN | FN | SE | SP | NPV | PPV | ACC | bACC | AUC | cutoff | LRn | LRp |
|---|---|---|---|---|---|---|---|---|---|---|---|---|---|---|---|---|
| Breslow depth <= 2 mm | | | | | | | | | | | | | | | | |
| GE | 56 | 505 | 52 | 446 | 59 | 4 | 0.93 | 0.12 | 0.94 | 0.1 | 0.2 | 0.52 | 0.76 | 0.081 | 0.61 | 1.1 |
| CL | 56 | 505 | 47 | 270 | 235 | 9 | 0.84 | 0.47 | 0.96 | 0.15 | 0.5 | 0.65 | 0.78 | 0.12 | 0.35 | 1.6 |
| GECL | 56 | 505 | 44 | 225 | 280 | 12 | 0.79 | 0.55 | 0.96 | 0.16 | 0.58 | 0.67 | 0.81 | 0.11 | 0.39 | 1.8 |
| Breslow depth > 2 mm | | | | | | | | | | | | | | | | |
| GE | 73 | 136 | 55 | 56 | 80 | 18 | 0.75 | 0.59 | 0.82 | 0.5 | 0.65 | 0.67 | 0.76 | 0.19 | 0.42 | 1.8 |
| CL | 73 | 136 | 72 | 131 | 5 | 1 | 0.99 | 0.037 | 0.83 | 0.35 | 0.37 | 0.51 | 0.78 | 0.16 | 0.37 | 1 |
| GECL | 73 | 136 | 70 | 108 | 28 | 3 | 0.96 | 0.21 | 0.9 | 0.39 | 0.47 | 0.58 | 0.81 | 0.17 | 0.2 | 1.2 |

TABLE 19a

Survival estimates at different timepoints for groups based on GECL classifier status or SLNB status. Survival curves were compared using a Cox Proportional Hazards model, see Table 25.
Melanoma Specific Survival

| Time (Months) | 0 | 40 | 80 | 120 | 160 |
|---|---|---|---|---|---|
| Survival Probability: GECL Negative | 1 | 0.977 | 0.966 | 0.966 | 0.966 |
| Survival Probability: GECL Positive | 1 | 0.933 | 0.802 | 0.717 | 0.645 |
| Survival Probability: SLNB Negative | 1 | 0.962 | 0.906 | 0.859 | 0.859 |
| Survival Probability: SLNB Positive | 1 | 0.903 | 0.704 | 0.704 | N/A |

TABLE 19b

Melanoma Specific Survival

| Time (Months) | 0 | 40 | 80 | 120 | 160 |
|---|---|---|---|---|---|
| Survival Probability: GECL Negative | 1 | 0.969 | 0.958 | 0.958 | 0.958 |
| Survival Probability: GECL Positive | 1 | 0.934 | 0.786 | 0.704 | N/A |
| Survival Probability: SLNB Negative | 1 | 0.962 | 0.905 | 0.866 | 0.866 |
| Survival Probability: SLNB Positive | 1 | 0.901 | 0.695 | 0.695 | N/A |

TABLE 19c

Melanoma Specific Survival

| Time (Months) | 0 | 40 | 80 | 120 | 160 |
|---|---|---|---|---|---|
| Survival Probability: GECL Negative | 1 | 0.970 | 0.962 | 0.962 | 0.962 |
| Survival Probability: GECL Positive | 1 | 0.941 | 0.816 | 0.754 | 0.678 |
| Survival Probability: SLNB Negative | 1 | 0.962 | 0.905 | 0.866 | 0.866 |
| Survival Probability: SLNB Positive | 1 | 0.901 | 0.695 | 0.695 | N/A |

TABLE 20a

Survival estimates at different timepoints for groups based on GECL classifier status or SLNB status. Survival curves were compared using a Cox Proportional Hazards model, see Table 25.
Distant Relapse Free Survival

| Time (Months) | 0 | 40 | 80 | 120 | 160 |
|---|---|---|---|---|---|
| Survival Probability: GECL Negative | 1 | 0.970 | 0.905 | 0.862 | 0.862 |
| Survival Probability: GECL Positive | 1 | 0.830 | 0.611 | 0.503 | 0.503 |
| Survival Probability: SLNB Negative | 1 | 0.913 | 0.796 | 0.711 | 0.711 |
| Survival Probability: SLNB Positive | 1 | 0.769 | 0.458 | 0.407 | N/A |

TABLE 20b

Distant Relapse Free Survival

| Time (Months) | 0 | 40 | 80 | 120 | 160 |
|---|---|---|---|---|---|
| Survival Probability: GECL Negative | 1 | 0.955 | 0.894 | 0.854 | 0.854 |
| Survival Probability: GECL Positive | 1 | 0.819 | 0.583 | 0.469 | N/A |
| Survival Probability: SLNB Negative | 1 | 0.912 | 0.793 | 0.716 | 0.716 |
| Survival Probability: SLNB Positive | 1 | 0.751 | 0.464 | 0.385 | N/A |

TABLE 20c

Distant Relapse Free Survival

| Time (Months) | 0 | 40 | 80 | 120 | 160 |
|---|---|---|---|---|---|
| Survival Probability: GECL Negative | 1 | 0.955 | 0.896 | 0.842 | 0.842 |
| Survival Probability: GECL Positive | 1 | 0.846 | 0.639 | 0.544 | 0.544 |
| Survival Probability: SLNB Negative | 1 | 0.912 | 0.793 | 0.716 | 0.716 |
| Survival Probability: SLNB Positive | 1 | 0.751 | 0.464 | 0.385 | N/A |

TABLE 21a

Survival estimates at different timepoints for groups based on GECL classifier status or SLNB status. Survival curves were compared using a Cox Proportional Hazards model, see Table 25.
Relapse Free Survival

| Time (Months) | 0 | 40 | 80 | 120 | 160 |
|---|---|---|---|---|---|
| Survival Probability: GECL Negative | 1 | 0.933 | 0.893 | 0.851 | 0.851 |
| Survival Probability: GECL Positive | 1 | 0.690 | 0.601 | 0.531 | 0.531 |
| Survival Probability: SLNB Negative | 1 | 0.834 | 0.783 | 0.712 | 0.712 |
| Survival Probability: SLNB Positive | 1 | 0.590 | 0.442 | 0.442 | N/A |

TABLE 21b

Relapse Free Survival

| Time (Months) | 0 | 40 | 80 | 120 | 160 |
|---|---|---|---|---|---|
| Survival Probability: GECL Negative | 1 | 0.911 | 0.870 | 0.832 | 0.832 |
| Survival Probability: GECL Positive | 1 | 0.674 | 0.584 | 0.518 | N/A |
| Survival Probability: SLNB Negative | 1 | 0.832 | 0.778 | 0.716 | 0.716 |
| Survival Probability: SLNB Positive | 1 | 0.582 | 0.459 | 0.459 | N/A |

TABLE 21c

Relapse Free Survival

| Time (Months) | 0 | 40 | 80 | 120 | 160 |
|---|---|---|---|---|---|
| Survival Probability: GECL Negative | 1 | 0.924 | 0.870 | 0.818 | 0.818 |
| Survival Probability: GECL Positive | 1 | 0.717 | 0.643 | 0.591 | 0.591 |
| Survival Probability: SLNB Negative | 1 | 0.832 | 0.778 | 0.716 | 0.716 |
| Survival Probability: SLNB Positive | 1 | 0.582 | 0.459 | 0.459 | N/A |

TABLE 22a

Survival estimates at different timepoints for groups based on SLNB and GECL classifier status. Survival curves were compared using a logrank test, p < 0.0001.

Melanoma Specific Survival

| Time (Months) | 0 | 40 | 80 | 120 | 160 |
|---|---|---|---|---|---|
| True negative SLNB (negative) & GECL (negative) | 1 | 0.981 | 0.969 | 0.969 | 0.969 |
| False Negative SLNB (positive) & GECL (negative) | 1 | 0.857 | 0.857 | N/A | N/A |
| False Positive SLNB (negative) & GECL (positive) | 1 | 0.942 | 0.842 | 0.725 | 0.7259 |
| True Positive SLNB (positive) & GECL (positive) | 1 | 0.908 | 0.691 | 0.691 | N/A |

TABLE 22b

Melanoma Specific Survival

| Time (Months) | 0 | 40 | 80 | 120 | 160 |
|---|---|---|---|---|---|
| True negative SLNB (negative) & GECL (negative) | 1 | 0.973 | 0.961 | 0.961 | 0.961 |
| False Negative SLNB (positive) & GECL (negative) | 1 | 0.833 | N/A | N/A | N/A |
| False Positive SLNB (negative) & GECL (positive) | 1 | 0.945 | 0.825 | 0.705 | N/A |
| True Positive SLNB (positive) & GECL (positive) | 1 | 0.907 | 0.697 | 0.697 | N/A |

TABLE 22c

Melanoma Specific Survival

| Time (Months) | 0 | 40 | 80 | 120 | 160 |
|---|---|---|---|---|---|
| True negative SLNB (negative) & GECL (negative) | 1 | 0.975 | 0.967 | 0.967 | 0.967 |
| False Negative SLNB (positive) & GECL (negative) | 1 | 0.750 | N/A | N/A | N/A |
| False Positive SLNB (negative) & GECL (positive) | 1 | 0.951 | 0.855 | 0.774 | 0.774 |
| True Positive SLNB (positive) & GECL (positive) | 1 | 0.910 | 0.699 | 0.699 | N/A |

TABLE 23a

Survival estimates at different timepoints for groups based on SLNB and GECL classifier status. Survival curves were compared using a logrank test, p < 0.0001.

Distant Relapse Free Survival

| Time (Months) | 0 | 40 | 80 | 120 | 160 |
|---|---|---|---|---|---|
| True negative SLNB (negative) & GECL (negative) | 1 | 0.980 | 0.922 | 0.877 | 0.877 |
| False Negative SLNB (positive) & GECL (negative) | 1 | 0.667 | 0.500 | N/A | N/A |

TABLE 23a-continued

Survival estimates at different timepoints for groups based on SLNB and GECL classifier status. Survival curves were compared using a logrank test, p < 0.0001.

Distant Relapse Free Survival

| Time (Months) | 0 | 40 | 80 | 120 | 160 |
|---|---|---|---|---|---|
| False Positive SLNB (negative) & GECL (positive) | 1 | 0.850 | 0.677 | 0.547 | 0.547 |
| True Positive SLNB(positive) & GECL (positive) | 1 | 0.778 | 0.453 | 0.396 | N/A |

TABLE 23b

Distant Relapse Free Survival

| Time (Months) | 0 | 40 | 80 | 120 | 160 |
|---|---|---|---|---|---|
| True negative SLNB (negative) & GECL (negative) | 1 | 0.963 | 0.910 | 0.869 | 0.869 |
| False Negative SLNB (positive) & GECL (negative) | 1 | 0.500 | N/A | N/A | N/A |
| False Positive SLNB (negative) & GECL (positive) | 1 | 0.844 | 0.637 | 0.507 | N/A |
| True Positive SLNB(positive) & GECL (positive) | 1 | 0.763 | 0.479 | 0.398 | N/A |

TABLE 23c

Distant Relapse Free Survival

| Time (Months) | 0 | 40 | 80 | 120 | 160 |
|---|---|---|---|---|---|
| True negative SLNB (negative) & GECL (negative) | 1 | 0.967 | 0.916 | 0.861 | 0.861 |
| False Negative SLNB (positive) & GECL (negative) | 1 | 0.500 | N/A | N/A | N/A |
| False Positive SLNB (negative) & GECL (positive) | 1 | 0.873 | 0.700 | 0.601 | 0.601 |
| True Positive SLNB(positive) & GECL (positive) | 1 | 0.765 | 0.480320 | 0.398 | N/A |

TABLE 24a

Survival estimates at different timepoints for groups based on SLNB and GECL classifier status. Survival curves were compared using a logrank test, $p < 0.0001$.

Relapse Free Survival

| Time (Months) | 0 | 40 | 80 | 120 | 160 |
|---|---|---|---|---|---|
| True negative SLNB (negative) & GECL (negative) | 1 | 0.949 | 0.908 | 0.863 | 0.863 |
| False Negative SLNB (positive) & GECL (negative) | 1 | 0.438 | 0.438 | N/A | N/A |
| False Positive SLNB (negative) & GECL (positive) | 1 | 0.723 | 0.663 | 0.563 | 0.563 |
| True Positive SLNB (positive) & GECL (positive) | 1 | 0.604 | 0.436 | 0.436 | N/A |

TABLE 24b

Relapse Free Survival

| Time (Months) | 0 | 40 | 80 | 120 | 160 |
|---|---|---|---|---|---|
| True negative SLNB (negative) & GECL (negative) | 1 | 0.925 | 0.883 | 0.845 | 0.845 |
| False Negative SLNB (positive) & GECL (negative) | 1 | 0.233 | N/A | N/A | N/A |
| False Positive SLNB (negative) & GECL (positive) | 1 | 0.707 | 0.636 | 0.537 | N/A |
| True Positive SLNB (positive) & GECL (positive) | 1 | 0.602 | 0.473 | 0.473 | N/A |

TABLE 24c

Relapse Free Survival

| Time (Months) | 0 | 40 | 80 | 120 | 160 |
|---|---|---|---|---|---|
| True negative SLNB (negative) & GECL (negative) | 1 | 0.939 | 0.884 | 0.831 | 0.831 |
| False Negative SLNB (positive) & GECL (negative) | 1 | 0.266 | N/A | N/A | N/A |
| False Positive SLNB (negative) & GECL (positive) | 1 | 0.757 | 0.704 | 0.632 | 0.632 |
| True Positive SLNB (positive) & GECL (positive) | 1 | 0.597 | 0.470 | 0.470 | N/A |

TABLE 25a

Hazard Ratios and p-values for the 2 curves from the GECL classifier outputs and SLNB biopsy results.

| | Melanoma Specific Survival Hazard Ratio (p-Value) | Distant Relapse Free Survival Hazard Ratio (p-Value) | Relapse Free Survival Hazard Ratio (p-Value) |
|---|---|---|---|
| Gene Expression & Clinical Variable (GECL) | 6.03 (p < 0.0001) | 5.28 (p < 0.0001) | 4.60 (p < 0.0001) |
| Sentinel Lymph nodes Biopsy Finding (SLNB) | 3.21 (p < 0.0001) | 3.27 (p < 0.0001) | 3.14 (p < 0.0001) |

TABLE 25b

| | Melanoma Specific Survival Hazard Ratio (p-Value) | Distant Relapse Free Survival Hazard Ratio (p-Value) | Relapse Free Survival Hazard Ratio (p-Value) |
|---|---|---|---|
| Gene Expression & Clinical Variable (GECL) | 4.69 (p < 0.0001) | 4.72 (p < 0.0001) | 3.95 (p < 0.0001) |
| Sentinel Lymph nodes Biopsy Finding (SLNB) | 3.36 (p < 0.0001) | 3.46 (p < 0.0001) | 3.17 (p < 0.0001) |

TABLE 25c

| | Melanoma Specific Survival Hazard Ratio (p-Value) | Distant Relapse Free Survival Hazard Ratio (p-Value) | Relapse Free Survival Hazard Ratio (p-Value) |
|---|---|---|---|
| Gene Expression & Clinical Variable (GECL) | 4.48 (p < 0.0001) | 4.00 (p < 0.0001) | 3.30 (p < 0.0001) |
| Sentinel Lymph nodes Biopsy Finding (SLNB) | 3.36 (p < 0.0001) | 3.46 (p < 0.0001) | 3.17 (p < 0.0001) |

TABLE 26a

Multivariate Hazard Ratios and p-values for the 2 curves from the GECL classifier outputs and SLNB biopsy

| | Melanoma Specific Survival Hazard Ratio (p-Value) | Distant Relapse Free Survival Hazard Ratio (p-Value) | Relapse Free Survival Hazard Ratio (p-Value) |
|---|---|---|---|
| Table 26a | | | |
| Gene Expression & Clinical Variable (GECL) | 4.92 (p = 0.0003) | 4.26 (p < 0.0001) | 3.76 (p < 0.0001) |

TABLE 26a-continued

Multivariate Hazard Ratios and p-values for the 2 curves from the
GECL classifier outputs and SLNB biopsy

|  | Melanoma Specific Survival Hazard Ratio (p-Value) | Distant Relapse Free Survival Hazard Ratio (p-Value) | Relapse Free Survival Hazard Ratio (p-Value) |
|---|---|---|---|
| Sentinel Lymph nodes Biopsy Finding (SLNB) | 2.00 (p = 0.0229) | (p = 0.0005) 2.10 | (p < 0.0001) 2.04 |
| Table 26b: | | | |
| Gene Expression & Clinical Variable (GECL) | 3.70 (p = 0.0009) | 3.68 (p < 0.0001) | 3.18 (p < 0.0001) |
| Sentinel Lymph nodes Biopsy Finding (SLNB) | 1.94 (p = 0.03641) | 2.00 (p = 0.0015) | 1.90 (p = 0.0011) |
| Table 26c: | | | |
| Gene Expression & Clinical Variable (GECL) | 3.45 (p = 0.00628) | 3.03 (p = 0.00021) | 2.59 (p = 0.00013) |
| Sentinel Lymph nodes Biopsy Finding (SLNB) | 2.33 (p = 0.00611) | 2.48 (p < 0.0001) | 2.35 (p < 0.0001) |

TABLE 27

| Input | P % | P | N | TP | FP | TN | FN | SE | SP | NPV |
|---|---|---|---|---|---|---|---|---|---|---|
| maxbACC | 0.17 | 128 | 626 | 90 | 167 | 459 | 38 | 0.7 | 0.73 | 0.92 |
| SEeqSP | 0.17 | 128 | 626 | 91 | 176 | 450 | 37 | 0.71 | 0.72 | 0.92 |
| NPV97 | 0.17 | 128 | 626 | 122 | 420 | 206 | 6 | 0.95 | 0.33 | 0.97 |
| NPV98 | 0.17 | 128 | 626 | 125 | 506 | 120 | 3 | 0.98 | 0.19 | 0.98 |

| Input | PPV | ACC | bACC | SLNB.RR | ER | AUC | cutoff | LRn | LRp |
|---|---|---|---|---|---|---|---|---|---|
| maxbACC | 0.35 | 0.73 | 0.72 | 0.66 | 0.05 | 0.79 | 0.17 | 0.4 | 2.6 |
| SEeqSP | 0.34 | 0.72 | 0.71 | 0.65 | 0.049 | 0.79 | 0.17 | 0.4 | 2.5 |
| NPV97 | 0.23 | 0.44 | 0.64 | 0.28 | 0.008 | 0.79 | 0.11 | 0.14 | 1.4 |
| NPV98 | 0.2 | 0.32 | 0.58 | 0.16 | 0.004 | 0.79 | 0.1 | 0.12 | 1.2 |

TABLE 28

| Input | P % | P | N | TP | FP | TN | FN | SE | SP | NPV |
|---|---|---|---|---|---|---|---|---|---|---|
| maxbACC | 0.17 | 128 | 626 | 89 | 170 | 456 | 39 | 0.7 | 0.73 | 0.92 |
| SEeqSP | 0.17 | 128 | 626 | 90 | 174 | 452 | 38 | 0.71 | 0.72 | 0.92 |
| NPV97 | 0.17 | 128 | 626 | 120 | 407 | 219 | 8.4 | 0.93 | 0.35 | 0.96 |
| NPV98 | 0.17 | 128 | 626 | 123 | 478 | 148 | 5 | 0.96 | 0.24 | 0.97 |

| Input | PPV | ACC | bACC | SLNB.RR | ER | AUC | cutoff | LRn | LRp |
|---|---|---|---|---|---|---|---|---|---|
| maxbACC | 0.35 | 0.72 | 0.71 | 0.66 | 0.051 | 0.77 | 0.17 | 0.41 | 2.6 |
| SEeqSP | 0.34 | 0.72 | 0.71 | 0.65 | 0.05 | 0.77 | 0.17 | 0.41 | 2.5 |
| NPV97 | 0.23 | 0.45 | 0.64 | 0.3 | 0.011 | 0.77 | 0.11 | 0.19 | 1.4 |
| NPV98 | 0.2 | 0.36 | 0.6 | 0.2 | 0.0066 | 0.77 | 0.1 | 0.16 | 1.3 |

TABLE 29

| Input | P % | P | N | TP | FP | TN | FN | SE | SP | NPV |
|---|---|---|---|---|---|---|---|---|---|---|
| maxbACC | 0.17 | 128 | 626 | 97 | 188 | 438 | 31 | 0.76 | 0.7 | 0.93 |
| SEeqSP | 0.17 | 128 | 626 | 95 | 171 | 455 | 33 | 0.74 | 0.73 | 0.93 |
| NPV97 | 0.17 | 128 | 626 | 120 | 319 | 307 | 8 | 0.94 | 0.49 | 0.97 |
| NPV98 | 0.17 | 128 | 626 | 124 | 431 | 195 | 4 | 0.97 | 0.31 | 0.98 |

| Input | PPV | ACC | bACC | SLNB.RR | ER | AUC | cutoff | LRn | LRp |
|---|---|---|---|---|---|---|---|---|---|
| maxbACC | 0.34 | 0.71 | 0.73 | 0.62 | 0.041 | 0.8 | 0.18 | 0.35 | 2.5 |
| SEeqSP | 0.36 | 0.73 | 0.73 | 0.65 | 0.044 | 0.8 | 0.19 | 0.35 | 2.7 |

TABLE 29-continued

|       |      |      |      |      |        |     |       |      |     |
|-------|------|------|------|------|--------|-----|-------|------|-----|
| NPV97 | 0.27 | 0.57 | 0.71 | 0.42 | 0.011  | 0.8 | 0.13  | 0.13 | 1.8 |
| NPV98 | 0.22 | 0.42 | 0.64 | 0.26 | 0.0053 | 0.8 | 0.099 | 0.1  | 1.4 |

TABLE 30

| Input    | P %  | P   | N   | TP  | FP  | TN  | FN  | SE   | SP   | NPV  |
|----------|------|-----|-----|-----|-----|-----|-----|------|------|------|
| maxbACC  | 0.17 | 128 | 626 | 88  | 181 | 445 | 40  | 0.69 | 0.71 | 0.92 |
| SEeqSP   | 0.17 | 128 | 626 | 86  | 167 | 459 | 42  | 0.67 | 0.73 | 0.92 |
| NPV97    | 0.17 | 128 | 626 | 112 | 305 | 321 | 16  | 0.87 | 0.51 | 0.95 |
| NPV98    | 0.17 | 128 | 626 | 120 | 408 | 218 | 7.6 | 0.94 | 0.35 | 0.97 |

| Input   | PPV  | ACC  | bACC | SLNB.RR | ER    | AUC  | cutoff | LRn  | LRp |
|---------|------|------|------|---------|-------|------|--------|------|-----|
| maxbACC | 0.33 | 0.71 | 0.7  | 0.64    | 0.053 | 0.78 | 0.18   | 0.44 | 2.4 |
| SEeqSP  | 0.34 | 0.72 | 0.7  | 0.67    | 0.056 | 0.78 | 0.19   | 0.45 | 2.5 |
| NPV97   | 0.27 | 0.57 | 0.69 | 0.45    | 0.022 | 0.78 | 0.13   | 0.25 | 1.8 |
| NPV98   | 0.23 | 0.45 | 0.64 | 0.3     | 0.01  | 0.78 | 0.099  | 0.17 | 1.5 |

TABLE 31

| Input   | P %  | P   | N   | TP  | FP  | TN  | FN | SE   | SP   | NPV  |
|---------|------|-----|-----|-----|-----|-----|----|------|------|------|
| maxbACC | 0.17 | 128 | 626 | 102 | 150 | 476 | 26 | 0.8  | 0.76 | 0.95 |
| SEeqSP  | 0.17 | 128 | 626 | 99  | 139 | 487 | 29 | 0.77 | 0.78 | 0.94 |
| NPV97   | 0.17 | 128 | 626 | 114 | 267 | 359 | 14 | 0.89 | 0.57 | 0.96 |
| NPV98   | 0.17 | 128 | 626 | 122 | 383 | 243 | 6  | 0.95 | 0.39 | 0.98 |

| Input   | PPV  | ACC  | bACC | SLNB.RR | ER    | AUC  | cutoff | LRn  | LRp |
|---------|------|------|------|---------|-------|------|--------|------|-----|
| maxbACC | 0.4  | 0.77 | 0.78 | 0.67    | 0.034 | 0.84 | 0.19   | 0.27 | 3.3 |
| SEeqSP  | 0.42 | 0.78 | 0.78 | 0.68    | 0.038 | 0.84 | 0.19   | 0.29 | 3.5 |
| NPV97   | 0.3  | 0.63 | 0.73 | 0.49    | 0.019 | 0.84 | 0.13   | 0.19 | 2.1 |
| NPV98   | 0.24 | 0.48 | 0.67 | 0.33    | 0.008 | 0.84 | 0.096  | 0.12 | 1.6 |

TABLE 32

| Input   | P %  | P   | N   | TP  | FP  | TN  | FN  | SE   | SP   | NPV  |
|---------|------|-----|-----|-----|-----|-----|-----|------|------|------|
| maxbACC | 0.17 | 128 | 626 | 94  | 150 | 476 | 34  | 0.73 | 0.76 | 0.93 |
| SEeqSP  | 0.17 | 128 | 626 | 92  | 142 | 484 | 36  | 0.72 | 0.77 | 0.93 |
| NPV97   | 0.17 | 128 | 626 | 112 | 255 | 371 | 16  | 0.87 | 0.59 | 0.96 |
| NPV98   | 0.17 | 128 | 626 | 119 | 369 | 257 | 8.8 | 0.93 | 0.41 | 0.97 |

| Input   | PPV  | ACC  | bACC | SLNB.RR | ER    | AUC  | cutoff | LRn  | LRp |
|---------|------|------|------|---------|-------|------|--------|------|-----|
| maxbACC | 0.39 | 0.76 | 0.75 | 0.68    | 0.045 | 0.82 | 0.19   | 0.35 | 3.1 |
| SEeqSP  | 0.39 | 0.76 | 0.74 | 0.69    | 0.048 | 0.82 | 0.19   | 0.37 | 3.2 |
| NPV97   | 0.31 | 0.64 | 0.73 | 0.51    | 0.022 | 0.82 | 0.13   | 0.22 | 2.2 |
| NPV98   | 0.24 | 0.5  | 0.67 | 0.35    | 0.012 | 0.82 | 0.097  | 0.17 | 1.6 |

TABLE 33

| maxbACC | | | | | | | | | | |
|---|---|---|---|---|---|---|---|---|---|---|
| Input | P % | P | N | TP | FP | TN | FN | SE | SP | NPV |
| CL   | 0.17 | 128 | 626 | 89 | 170 | 456 | 39 | 0.7  | 0.73 | 0.92 |
| GE   | 0.17 | 128 | 626 | 88 | 181 | 445 | 40 | 0.69 | 0.71 | 0.92 |
| GECL | 0.17 | 128 | 626 | 94 | 150 | 476 | 34 | 0.73 | 0.76 | 0.93 |

| Input | PPV  | ACC  | bACC | SLNB.RR | ER    | AUC  | cutoff | LRn  | LRp |
|-------|------|------|------|---------|-------|------|--------|------|-----|
| CL    | 0.35 | 0.72 | 0.71 | 0.66    | 0.051 | 0.77 | 0.17   | 0.41 | 2.6 |
| GE    | 0.33 | 0.71 | 0.7  | 0.64    | 0.053 | 0.78 | 0.18   | 0.44 | 2.4 |
| GECL  | 0.39 | 0.76 | 0.75 | 0.68    | 0.045 | 0.82 | 0.19   | 0.35 | 3.1 |

TABLE 34

SEeqSP

| Input | P % | P | N | TP | FP | TN | FN | SE | SP | NPV |
|---|---|---|---|---|---|---|---|---|---|---|
| CL | 0.17 | 128 | 626 | 90 | 174 | 452 | 38 | 0.71 | 0.72 | 0.92 |
| GE | 0.17 | 128 | 626 | 86 | 167 | 459 | 42 | 0.67 | 0.73 | 0.92 |
| GECL | 0.17 | 128 | 626 | 92 | 142 | 484 | 36 | 0.72 | 0.77 | 0.93 |

| Input | PPV | ACC | bACC | SLNB.RR | ER | AUC | cutoff | LRn | LRp |
|---|---|---|---|---|---|---|---|---|---|
| CL | 0.34 | 0.72 | 0.71 | 0.65 | 0.05 | 0.77 | 0.17 | 0.41 | 2.5 |
| GE | 0.34 | 0.72 | 0.7 | 0.67 | 0.056 | 0.78 | 0.19 | 0.45 | 2.5 |
| GECL | 0.39 | 0.76 | 0.74 | 0.69 | 0.048 | 0.82 | 0.19 | 0.37 | 3.2 |

TABLE 35

NPV 97

| Input | P % | P | N | TP | FP | TN | FN | SE | SP | NPV | PPV | ACC | bACC | SLNB.RR | ER | AUC | cutoff | LRn | LRp |
|---|---|---|---|---|---|---|---|---|---|---|---|---|---|---|---|---|---|---|---|
| CL | 0.17 | 128 | 626 | 120 | 407 | 219 | 8.4 | 0.93 | 0.35 | 0.96 | 0.23 | 0.45 | 0.64 | 0.3 | 0.011 | 0.77 | 0.11 | 0.19 | 1.4 |
| GE | 0.17 | 128 | 626 | 112 | 305 | 321 | 16 | 0.87 | 0.51 | 0.95 | 0.27 | 0.57 | 0.69 | 0.45 | 0.022 | 0.78 | 0.13 | 0.25 | 1.8 |
| GECL | 0.17 | 128 | 626 | 112 | 255 | 371 | 16 | 0.87 | 0.59 | 0.96 | 0.31 | 0.64 | 0.73 | 0.51 | 0.022 | 0.82 | 0.13 | 0.22 | 2.2 |

TABLE 36

NPV 98

| Input | P % | P | N | TP | FP | TN | FN | SE | SP | NPV | PPV | ACC | bACC | SLNB.RR | ER | AUC | cutoff | LRn | LRp |
|---|---|---|---|---|---|---|---|---|---|---|---|---|---|---|---|---|---|---|---|
| CL | 0.17 | 128 | 626 | 123 | 478 | 148 | 5 | 0.96 | 0.24 | 0.97 | 0.2 | 0.36 | 0.6 | 0.2 | 0.0066 | 0.77 | 0.1 | 0.16 | 1.3 |
| GE | 0.17 | 128 | 626 | 120 | 408 | 218 | 7.6 | 0.94 | 0.35 | 0.97 | 0.23 | 0.45 | 0.64 | 0.3 | 0.01 | 0.78 | 0.099 | 0.17 | 1.5 |
| GECL | 0.17 | 128 | 626 | 119 | 369 | 257 | 8.8 | 0.93 | 0.41 | 0.97 | 0.24 | 0.5 | 0.67 | 0.35 | 0.012 | 0.82 | 0.097 | 0.17 | 1.6 |

TABLE 37

CL

| | Input | P % | P | N | TP | FP | TN | FN | SE | SP | NPV |
|---|---|---|---|---|---|---|---|---|---|---|---|
| 1 | T1b | 0.033 | 6 | 178 | 3.4 | 47 | 131 | 2.6 | 0.57 | 0.74 | 0.98 |
| 11 | T2a | 0.13 | 39 | 253 | 34 | 176 | 77 | 5.1 | 0.87 | 0.31 | 0.94 |
| 12 | T2b | 0.17 | 11 | 55 | 10 | 48 | 7.3 | 0.79 | 0.93 | 0.13 | 0.89 |
| 13 | T3a | 0.31 | 38 | 85 | 38 | 85 | 0.04 | 0 | 1 | 0.00048 | 1 |
| 14 | T3b | 0.43 | 34 | 45 | 34 | 45 | 0.01 | 0 | 1 | 0.00022 | 1 |

| | Input | PPV | ACC | bACC | SLNB.RR | ER | AUC | cutoff | LRn | LRp |
|---|---|---|---|---|---|---|---|---|---|---|
| 1 | T1b | 0.07 | 0.73 | 0.66 | 0.73 | 0.014 | 0.68 | 0.11 | 0.57 | 2.3 |
| 11 | T2a | 0.16 | 0.38 | 0.59 | 0.28 | 0.017 | 0.68 | 0.11 | 0.42 | 1.3 |
| 12 | T2b | 0.18 | 0.27 | 0.53 | 0.12 | 0.012 | 0.7 | 0.11 | 0.66 | 1.1 |
| 13 | T3a | 0.31 | 0.31 | 0.5 | 0.00032 | 0 | 0.62 | 0.11 | 0 | 1 |
| 14 | T3b | 0.43 | 0.43 | 0.5 | 0.00013 | 0 | 0.6 | 0.11 | 0 | 1 |

TABLE 38

GE

| Input | P % | P | N | TP | FP | TN | FN | SE | SP | NPV |
|---|---|---|---|---|---|---|---|---|---|---|
| T1b | 0.033 | 6 | 178 | 2.3 | 51 | 127 | 3.7 | 0.38 | 0.71 | 0.97 |
| T2a | 0.13 | 39 | 253 | 30 | 119 | 134 | 8.9 | 0.77 | 0.53 | 0.94 |
| T2b | 0.17 | 11 | 55 | 11 | 39 | 16 | 0.19 | 0.98 | 0.28 | 0.99 |

TABLE 38-continued

| Input | | | | | | | | | |
|---|---|---|---|---|---|---|---|---|---|
| T3a | 0.31 | 38 | 85 | 35 | 56 | 29 | 3.2 | 0.91 | 0.34 | 0.9 |
| T3b | 0.43 | 34 | 45 | 34 | 36 | 9.1 | 0.27 | 0.99 | 0.2 | 0.98 |

| Input | PPV | ACC | bACC | SLNB.RR | ER | AUC | cutoff | LRn | LRp |
|---|---|---|---|---|---|---|---|---|---|
| T1b | 0.042 | 0.7 | 0.55 | 0.71 | 0.02 | 0.55 | 0.13 | 0.87 | 1.3 |
| T2a | 0.2 | 0.56 | 0.65 | 0.49 | 0.03 | 0.71 | 0.13 | 0.43 | 1.6 |
| T2b | 0.21 | 0.4 | 0.63 | 0.24 | 0.0029 | 0.66 | 0.13 | 0.059 | 1.4 |
| T3a | 0.38 | 0.51 | 0.63 | 0.26 | 0.026 | 0.73 | 0.13 | 0.25 | 1.4 |
| T3b | 0.49 | 0.54 | 0.6 | 0.12 | 0.0035 | 0.73 | 0.13 | 0.037 | 1.2 |

TABLE 39

GECL

| Input | P % | P | N | TP | FP | TN | FN | SE | SP | NPV |
|---|---|---|---|---|---|---|---|---|---|---|
| T1b | 0.033 | 6 | 178 | 1.7 | 19 | 159 | 4.3 | 0.28 | 0.89 | 0.97 |
| T2a | 0.13 | 39 | 253 | 29 | 88 | 165 | 9.8 | 0.75 | 0.65 | 0.94 |
| T2b | 0.17 | 11 | 55 | 9.8 | 35 | 20 | 1.2 | 0.89 | 0.36 | 0.94 |
| T3a | 0.31 | 38 | 85 | 37 | 70 | 15 | 1.1 | 0.97 | 0.17 | 0.94 |
| T3b | 0.43 | 34 | 45 | 34 | 40 | 5.1 | 0.03 | 1 | 0.11 | 1 |

| Input | PPV | ACC | bACC | SLNB.RR | ER | AUC | cutoff | LRn | LRp |
|---|---|---|---|---|---|---|---|---|---|
| T1b | 0.082 | 0.87 | 0.58 | 0.89 | 0.024 | 0.59 | 0.13 | 0.81 | 2.7 |
| T2a | 0.25 | 0.66 | 0.7 | 0.6 | 0.034 | 0.75 | 0.13 | 0.39 | 2.2 |
| T2b | 0.22 | 0.45 | 0.62 | 0.32 | 0.019 | 0.72 | 0.13 | 0.31 | 1.4 |
| T3a | 0.35 | 0.42 | 0.57 | 0.13 | 0.0084 | 0.75 | 0.13 | 0.15 | 1.2 |
| T3b | 0.46 | 0.49 | 0.56 | 0.065 | 0.00039 | 0.74 | 0.13 | 0.0067 | 1.1 |

TABLE 40

CL

| Input | P % | P | N | TP | FP | TN | FN | SE | SP | NPV |
|---|---|---|---|---|---|---|---|---|---|---|
| T1b | 0.033 | 6 | 178 | 4.2 | 80 | 98 | 1.9 | 0.69 | 0.55 | 0.98 |
| T2a | 0.13 | 39 | 253 | 36 | 209 | 44 | 2.8 | 0.93 | 0.17 | 0.94 |
| T2b | 0.17 | 11 | 55 | 11 | 52 | 3.3 | 0.34 | 0.97 | 0.06 | 0.92 |
| T3a | 0.31 | 38 | 85 | 38 | 85 | 0.01 | 0 | 1 | 0.00012 | 1 |
| T3b | 0.43 | 34 | 45 | 34 | 45 | 0.01 | 0 | 1 | 0.00022 | 1 |

| Input | PPV | ACC | bACC | SLNB.RR | ER | AUC | cutoff | LRn | LRp |
|---|---|---|---|---|---|---|---|---|---|
| T1b | 0.051 | 0.56 | 0.62 | 0.54 | 0.01 | 0.68 | 0.1 | 0.56 | 1.6 |
| T2a | 0.15 | 0.28 | 0.55 | 0.16 | 0.0094 | 0.68 | 0.1 | 0.4 | 1.1 |
| T2b | 0.17 | 0.21 | 0.52 | 0.056 | 0.0051 | 0.7 | 0.1 | 0.56 | 1 |
| T3a | 0.31 | 0.31 | 0.5 | 8.1e−05 | 0 | 0.62 | 0.1 | 0 | 1 |
| T3b | 0.43 | 0.43 | 0.5 | 0.00013 | 0 | 0.6 | 0.1 | 0 | 1 |

TABLE 41

GE

| Input | P % | P | N | TP | FP | TN | FN | SE | SP | NPV |
|---|---|---|---|---|---|---|---|---|---|---|
| T1b | 0.033 | 6 | 178 | 3.6 | 84 | 94 | 2.4 | 0.61 | 0.53 | 0.98 |
| T2a | 0.13 | 39 | 253 | 35 | 166 | 87 | 4.3 | 0.89 | 0.35 | 0.95 |
| T2b | 0.17 | 11 | 55 | 11 | 45 | 9.5 | 0.02 | 1 | 0.17 | 1 |
| T3a | 0.31 | 38 | 85 | 37 | 69 | 16 | 0.86 | 0.98 | 0.19 | 0.96 |
| T3b | 0.43 | 34 | 45 | 34 | 40 | 5 | 0.05 | 1 | 0.11 | 0.99 |

| Input | PPV | ACC | bACC | SLNB.RR | ER | AUC | cutoff | LRn | LRp |
|---|---|---|---|---|---|---|---|---|---|
| T1b | 0.042 | 0.53 | 0.57 | 0.52 | 0.013 | 0.55 | 0.099 | 0.75 | 1.3 |
| T2a | 0.17 | 0.42 | 0.62 | 0.31 | 0.015 | 0.71 | 0.099 | 0.32 | 1.4 |

TABLE 41-continued

| | | | | | | | | | |
|---|---|---|---|---|---|---|---|---|---|
| T2b | 0.19 | 0.31 | 0.59 | 0.15 | 3e−04 | 0.66 | 0.099 | 0.0083 | 1.2 |
| T3a | 0.35 | 0.43 | 0.58 | 0.14 | 0.0069 | 0.73 | 0.099 | 0.11 | 1.2 |
| T3b | 0.46 | 0.49 | 0.55 | 0.063 | 0.00065 | 0.73 | 0.099 | 0.014 | 1.1 |

TABLE 42

GECL

| Input | P % | P | N | TP | FP | TN | FN | SE | SP | NPV |
|---|---|---|---|---|---|---|---|---|---|---|
| T1b | 0.033 | 6 | 178 | 2.8 | 52 | 126 | 3.2 | 0.47 | 0.71 | 0.98 |
| T2a | 0.13 | 39 | 253 | 34 | 147 | 106 | 5.2 | 0.87 | 0.42 | 0.95 |
| T2b | 0.17 | 11 | 55 | 11 | 44 | 11 | 0.26 | 0.98 | 0.2 | 0.98 |
| T3a | 0.31 | 38 | 85 | 38 | 79 | 5.9 | 0.13 | 1 | 0.069 | 0.99 |
| T3b | 0.43 | 34 | 45 | 34 | 43 | 2.4 | 0 | 1 | 0.054 | 1 |

| Input | PPV | ACC | bACC | SLNB.RR | ER | AUC | cutoff | LRn | LRp |
|---|---|---|---|---|---|---|---|---|---|
| T1b | 0.053 | 0.7 | 0.59 | 0.7 | 0.017 | 0.59 | 0.097 | 0.75 | 1.7 |
| T2a | 0.19 | 0.48 | 0.64 | 0.38 | 0.018 | 0.75 | 0.097 | 0.32 | 1.5 |
| T2b | 0.2 | 0.33 | 0.59 | 0.17 | 0.0039 | 0.72 | 0.097 | 0.1 | 1.2 |
| T3a | 0.32 | 0.36 | 0.53 | 0.049 | 0.0011 | 0.75 | 0.097 | 0.037 | 1.1 |
| T3b | 0.44 | 0.46 | 0.52 | 0.031 | 0 | 0.74 | 0.097 | 0 | 1 |

TABLE 43

CL

| Input | P % | P | N | TP | FP | TN | FN | SE | SP | NPV |
|---|---|---|---|---|---|---|---|---|---|---|
| stageIB | 0.095 | 45 | 431 | 37 | 222 | 209 | 7.6 | 0.83 | 0.48 | 0.96 |
| stageIIA | 0.26 | 49 | 140 | 48 | 133 | 7.4 | 0.79 | 0.98 | 0.053 | 0.89 |
| stageIIB | 0.43 | 34 | 45 | 34 | 45 | 0.01 | 0 | 1 | 0.00022 | 1 |

| Input | PPV | ACC | bACC | SLNB.RR | ER | AUC | cutoff | LRn | LRp |
|---|---|---|---|---|---|---|---|---|---|
| stageIB | 0.14 | 0.52 | 0.66 | 0.45 | 0.016 | 0.73 | 0.11 | 0.35 | 1.6 |
| stageIIA | 0.27 | 0.3 | 0.52 | 0.043 | 0.0042 | 0.67 | 0.11 | 0.37 | 1 |
| stageIIB | 0.43 | 0.43 | 0.5 | 0.00013 | 0 | 0.6 | 0.11 | 0 | 1 |

TABLE 44

GE

| Input | P % | P | N | TP | FP | TN | FN | SE | SP | NPV |
|---|---|---|---|---|---|---|---|---|---|---|
| stageIB | 0.095 | 45 | 431 | 32 | 171 | 260 | 13 | 0.72 | 0.6 | 0.95 |
| stageIIA | 0.26 | 49 | 140 | 46 | 96 | 44 | 3.4 | 0.93 | 0.32 | 0.93 |
| stageIIB | 0.43 | 34 | 45 | 34 | 36 | 9.1 | 0.27 | 0.99 | 0.2 | 0.98 |

| Input | PPV | ACC | bACC | SLNB.RR | ER | AUC | cutoff | LRn | LRp |
|---|---|---|---|---|---|---|---|---|---|
| stageIB | 0.16 | 0.62 | 0.66 | 0.57 | 0.026 | 0.72 | 0.13 | 0.46 | 1.8 |
| stageIIA | 0.32 | 0.47 | 0.62 | 0.25 | 0.018 | 0.71 | 0.13 | 0.22 | 1.4 |
| stageIIB | 0.49 | 0.54 | 0.6 | 0.12 | 0.0035 | 0.73 | 0.13 | 0.037 | 1.2 |

TABLE 45

GECL

| Input | P % | P | N | TP | FP | TN | FN | SE | SP | NPV |
|---|---|---|---|---|---|---|---|---|---|---|
| stageIB | 0.095 | 45 | 431 | 31 | 108 | 323 | 14 | 0.69 | 0.75 | 0.96 |
| stageIIA | 0.26 | 49 | 140 | 47 | 105 | 35 | 2.3 | 0.95 | 0.25 | 0.94 |
| stageIIB | 0.43 | 34 | 45 | 34 | 40 | 5.1 | 0.03 | 1 | 0.11 | 1 |

| Input | PPV | ACC | bACC | SLNB.RR | ER | AUC | cutoff | LRn | LRp |
|---|---|---|---|---|---|---|---|---|---|
| stageIB | 0.23 | 0.74 | 0.72 | 0.71 | 0.03 | 0.77 | 0.13 | 0.42 | 2.8 |
| stageIIA | 0.31 | 0.43 | 0.6 | 0.19 | 0.012 | 0.76 | 0.13 | 0.18 | 1.3 |
| stageIIB | 0.46 | 0.49 | 0.56 | 0.065 | 0.00039 | 0.74 | 0.13 | 0.0067 | 1.1 |

TABLE 46

| | | | | CL | | | | | |
|---|---|---|---|---|---|---|---|---|---|
| Input | P % | P | N | TP | FP | TN | FN | SE | SP | NPV |
| stageIB | 0.095 | 45 | 431 | 40 | 289 | 142 | 4.6 | 0.9 | 0.33 | 0.97 |
| stageIIA | 0.26 | 49 | 140 | 49 | 137 | 3.3 | 0.34 | 0.99 | 0.024 | 0.92 |
| stageIIB | 0.43 | 34 | 45 | 34 | 45 | 0.01 | 0 | 1 | 0.00022 | 1 |

| Input | PPV | ACC | bACC | SLNB.RR | ER | AUC | cutoff | LRn | LRp |
|---|---|---|---|---|---|---|---|---|---|
| stageIB | 0.12 | 0.38 | 0.61 | 0.31 | 0.0099 | 0.73 | 0.1 | 0.31 | 1.3 |
| stageIIA | 0.26 | 0.28 | 0.51 | 0.019 | 0.0018 | 0.67 | 0.1 | 0.31 | 1 |
| stageIIB | 0.43 | 0.43 | 0.5 | 0.00013 | 0 | 0.6 | 0.1 | 0 | 1 |

TABLE 47

| | | | | GE | | | | | |
|---|---|---|---|---|---|---|---|---|---|
| Input | P % | P | N | TP | FP | TN | FN | SE | SP | NPV |
| stageIB | 0.095 | 45 | 431 | 38 | 250 | 181 | 6.7 | 0.85 | 0.42 | 0.96 |
| stageIIA | 0.26 | 49 | 140 | 48 | 114 | 26 | 0.88 | 0.98 | 0.18 | 0.97 |
| stageIIB | 0.43 | 34 | 45 | 34 | 40 | 5 | 0.05 | 1 | 0.11 | 0.99 |

| Input | PPV | ACC | bACC | SLNB.RR | ER | AUC | cutoff | LRn | LRp |
|---|---|---|---|---|---|---|---|---|---|
| stageIB | 0.13 | 0.46 | 0.64 | 0.4 | 0.014 | 0.72 | 0.099 | 0.35 | 1.5 |
| stageIIA | 0.3 | 0.39 | 0.58 | 0.14 | 0.0047 | 0.71 | 0.099 | 0.088 | 1.2 |
| stageIIB | 0.46 | 0.49 | 0.55 | 0.063 | 0.00065 | 0.73 | 0.099 | 0.014 | 1.1 |

TABLE 48

| | | | | CLGE | | | | | |
|---|---|---|---|---|---|---|---|---|---|
| Input | P % | P | N | TP | FP | TN | FN | SE | SP | NPV |
| stageIB | 0.095 | 45 | 431 | 37 | 200 | 231 | 8.4 | 0.81 | 0.54 | 0.97 |
| stageIIA | 0.26 | 49 | 140 | 49 | 123 | 17 | 0.39 | 0.99 | 0.12 | 0.98 |
| stageIIB | 0.43 | 34 | 45 | 34 | 43 | 2.4 | 0 | 1 | 0.054 | 1 |

| Input | PPV | ACC | bACC | SLNB.RR | ER | AUC | cutoff | LRn | LRp |
|---|---|---|---|---|---|---|---|---|---|
| stageIB | 0.16 | 0.56 | 0.68 | 0.5 | 0.018 | 0.77 | 0.097 | 0.34 | 1.8 |
| stageIIA | 0.28 | 0.35 | 0.56 | 0.092 | 0.0021 | 0.76 | 0.097 | 0.055 | 1.1 |
| stageIIB | 0.44 | 0.46 | 0.52 | 0.031 | 0 | 0.74 | 0.097 | 0 | 1 |

TABLE 49

Min and max AUC

| | subset of 2 | subset of 3 | subset of 4 | subset of 5 | subset of 6 | subset of 7 | subset of 8 |
|---|---|---|---|---|---|---|---|
| n subsets | 36 | 84 | 126 | 126 | 84 | 36 | 9 |
| min AUC | 0.68 | 0.71 | 0.73 | 0.76 | 0.78 | 0.79 | 0.81 |
| max AUC | 0.79 | 0.8 | 0.8 | 0.81 | 0.81 | 0.82 | 0.82 |

The invention claimed is:

1. A method for treating an individual afflicted with primary cutaneous melanoma, the method comprising:
   determining in a sample from the individual a gene expression signature comprising ITGB3, PLAT, GDF15, IL8, and at least three genes selected from MLANA, LOXL4, SERPINE2, and TGFBR1,
   classifying the individual as having a metastasis-positive sentinel lymph node based upon the gene expression signature, and
   treating the individual by providing a cancer treatment to the individual,
   wherein the cancer treatment comprises administration of an antibody selected from the group consisting of ipilimumab, nivolumab, and pembrolizumab.

2. The method according to claim 1, wherein the gene expression further comprises gene ADIPOQ.

3. The method according to claim 1, wherein the method for classifying further comprises determining the age of the individual and/or Breslow depth, and optionally also determining ulceration of a melanoma lesion.

4. The method according to claim 1, wherein the sample is a biopsy from a primary cutaneous melanoma lesion.

5. The method according to claim 1, wherein the expression is determined by the detection of RNA and/or mRNA.

6. The method according to claim 1, comprising
   extracting RNA from a primary cutaneous melanoma lesion from the individual;
   reverse transcribing an RNA transcript from the genes to produce cDNAs of the RNA transcripts; and
   amplifying the cDNAs to produce amplicons from the cDNAs for determination of expression levels of the RNA transcripts.

7. The method according to claim 6, wherein the method is performed utilizing quantitative PCR.

8. The method according to claim 7, wherein the amplicon expression levels are normalized against a level of an amplicon from a cDNA of at least one reference RNA transcript in the sample, and optionally wherein the reference RNA transcript is selected from the group consisting of ACTB, RPLP0, RPL8, and a combination of any thereof.

9. The method according to claim 6, wherein the amplicon expression levels are indicated as threshold cycle (Ct) values.

10. A method comprising
extracting RNA from a primary cutaneous melanoma lesion from an individual;
reverse transcribing an RNA transcript of at least the following genes ITGB3, PLAT, GDF15, IL8, MLANA, LOXL4, SERPINE2, and TGFBR1 to produce cDNAs of the RNA transcripts; and
amplifying the cDNAs to produce amplicons from the cDNAs for determination of expression levels of the RNA transcripts of ITGB3, PLAT, GDF15, IL8, MLANA, LOXL4, SERPINE2, and TGFBR1.

11. A method of treating an individual afflicted with primary cutaneous melanoma, wherein the individual has a metastasis-positive sentinel lymph node as determined by a gene expression signature comprising ITGB3, PLAT, GDF15, IL8, MLANA, LOXL4, SERPINE2, and TGFBR1, the method comprising:
administering a cancer treatment to the individual, wherein the cancer treatment is selected from the group consisting of chemotherapy, radiation therapy, immunotherapy, antibody therapy, BRAF inhibitor, MEK inhibitor, and a combination of any thereof.

12. A method of treating an individual afflicted with primary cutaneous melanoma, wherein the individual has a metastasis-positive sentinel lymph node as determined by a gene expression signature comprising ITGB3, PLAT, GDF15, IL8, and at least three genes selected from MLANA, LOXL4, SERPINE2, and TGFBR1 the method comprising:
administering a cancer treatment to the individual, wherein the cancer treatment is antibody therapy, which antibody therapy comprises administration of an antibody selected from the group consisting of ipilimumab, nivolumab, and pembrolizumab.

13. The method according to claim 1, the method further comprising:
performing a sentinel lymph node biopsy on the individual.

14. The method according to claim 11, the method further comprising:
performing a sentinel lymph node biopsy on the individual.

* * * * *